May 9, 1967 G. H. BALDING 3,319,248
ELECTRONIC VISUAL CUE GENERATOR FOR PROVIDING
AN INTEGRATED DISPLAY
Filed July 16, 1965 12 Sheets-Sheet 1

INVENTOR
GEORGE H. BALDING

BY Brown Jackson Boettcher & Dienner

ATTYS.

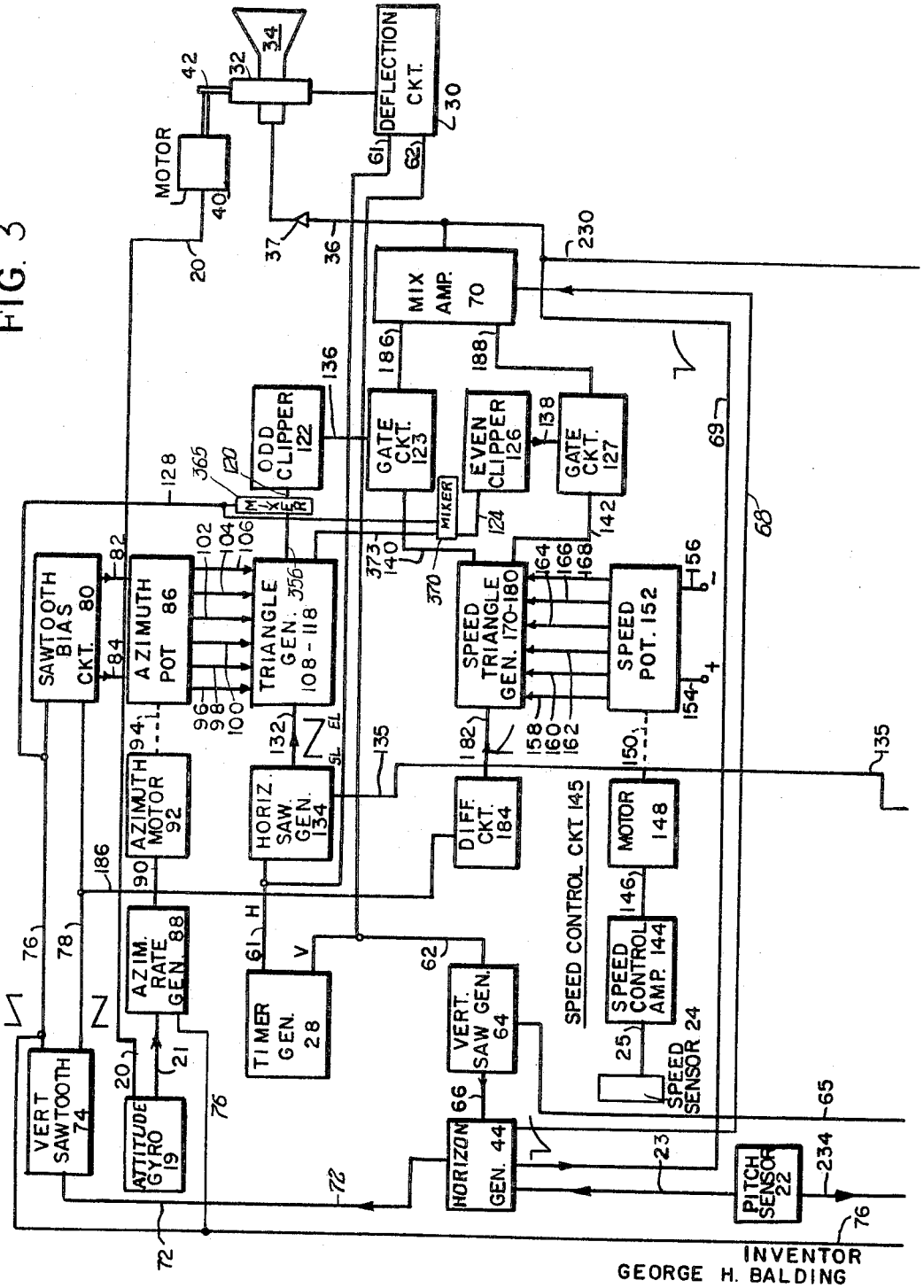

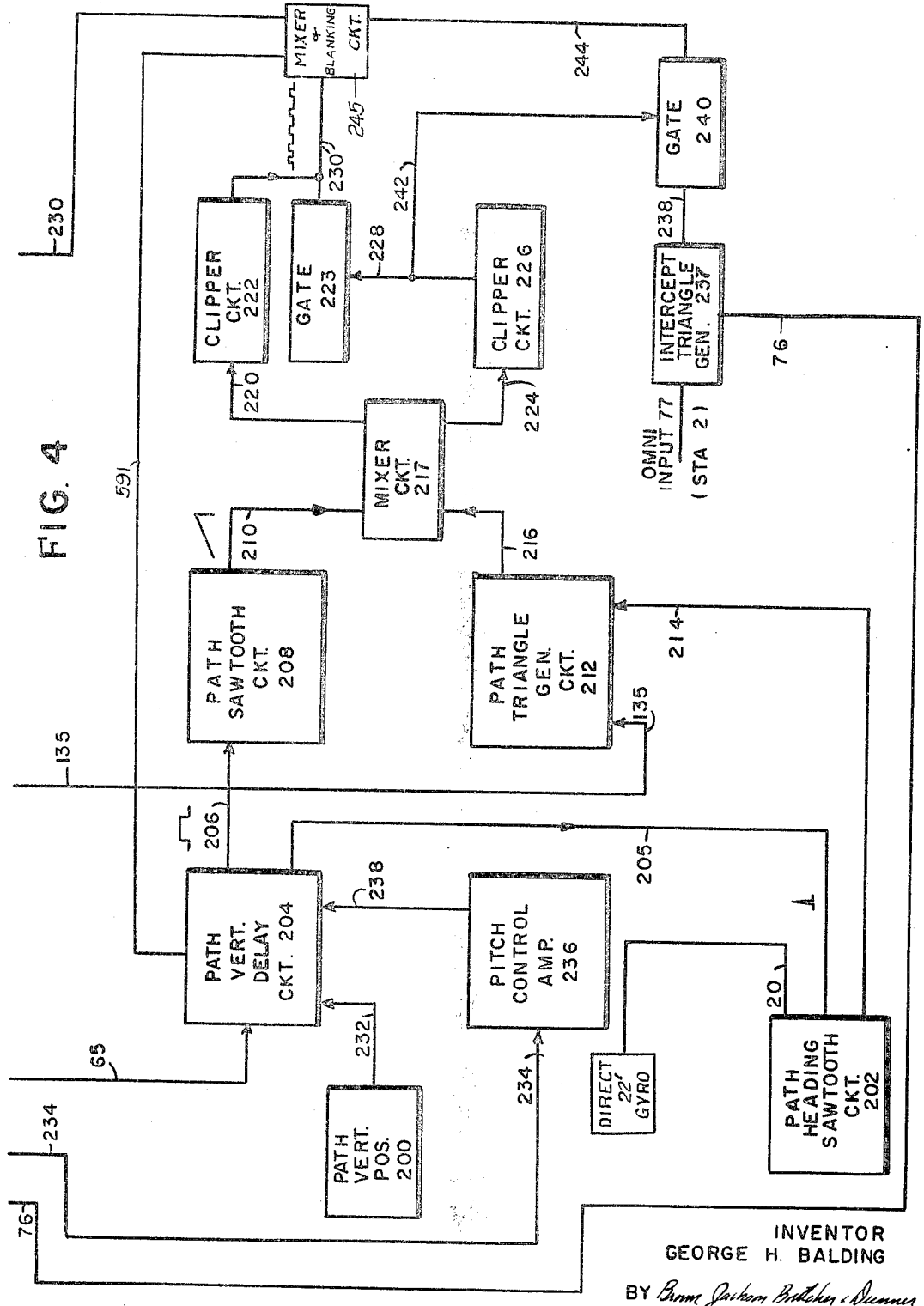

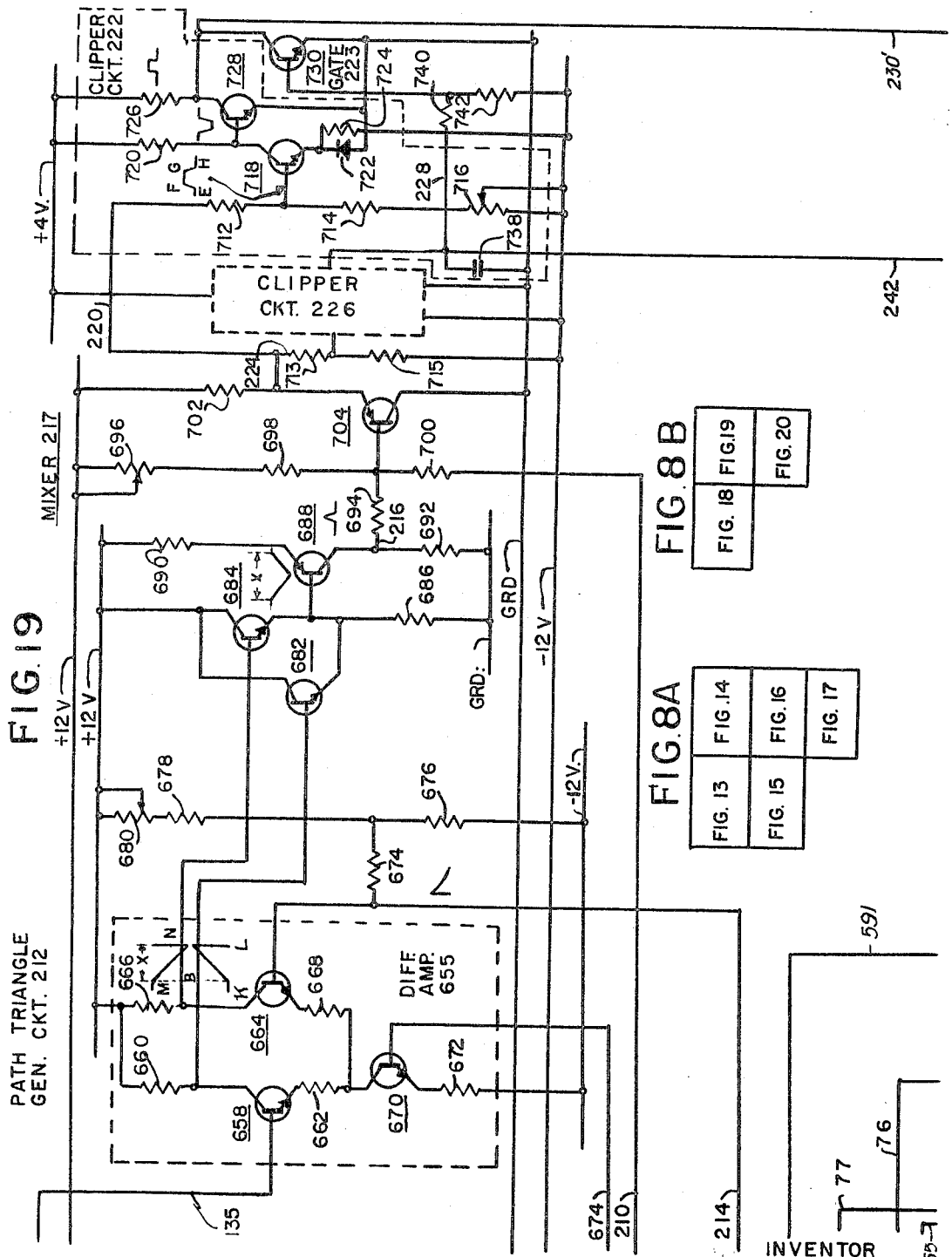

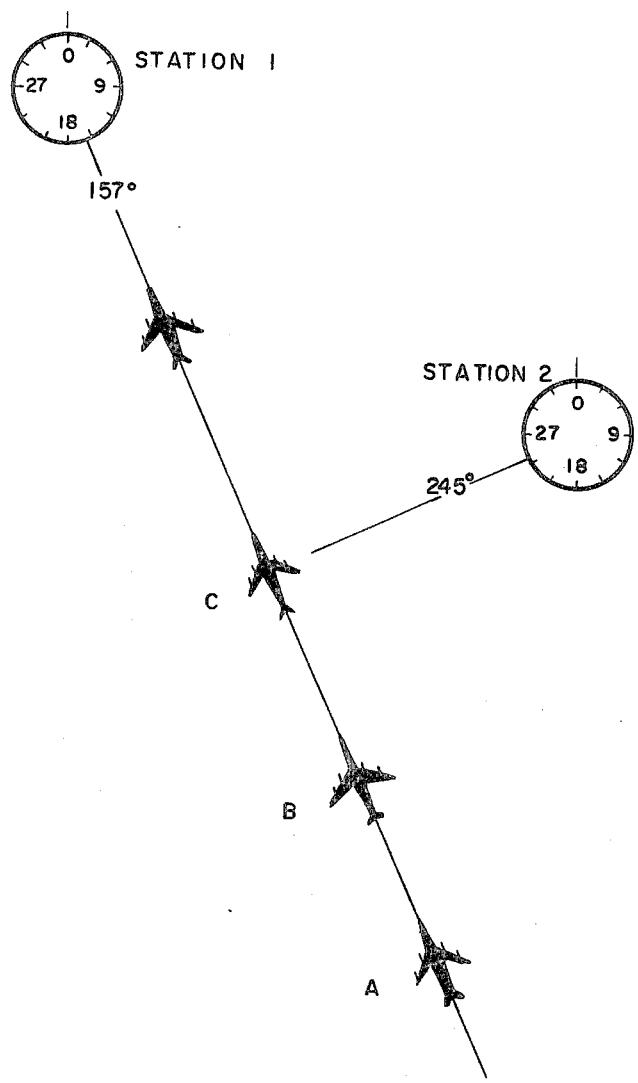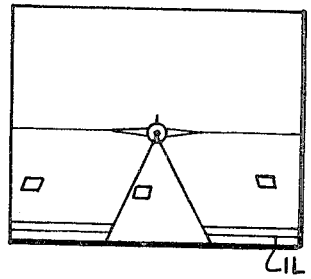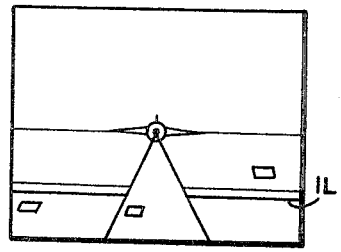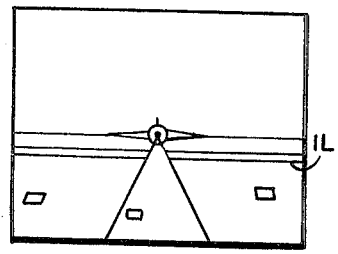

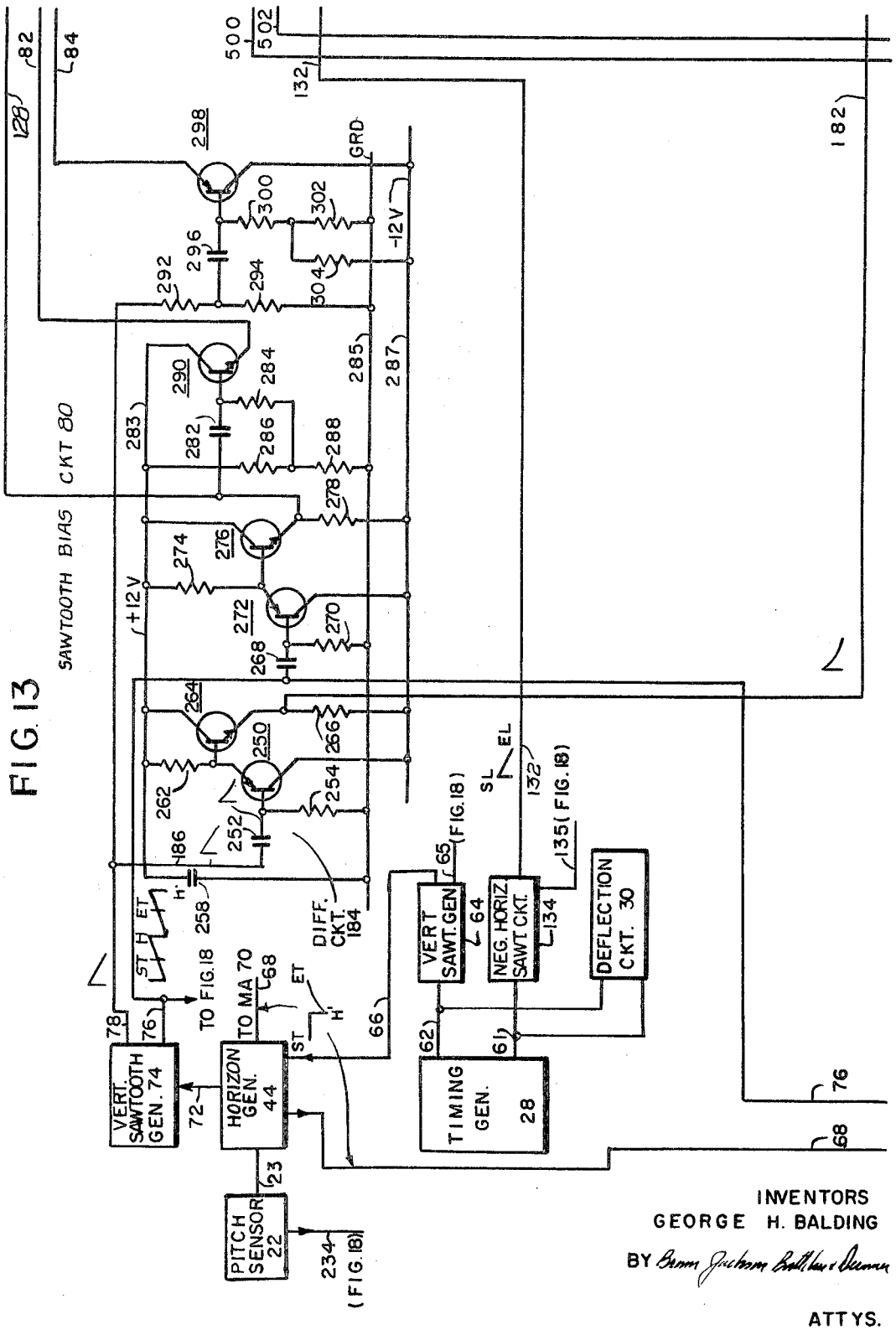

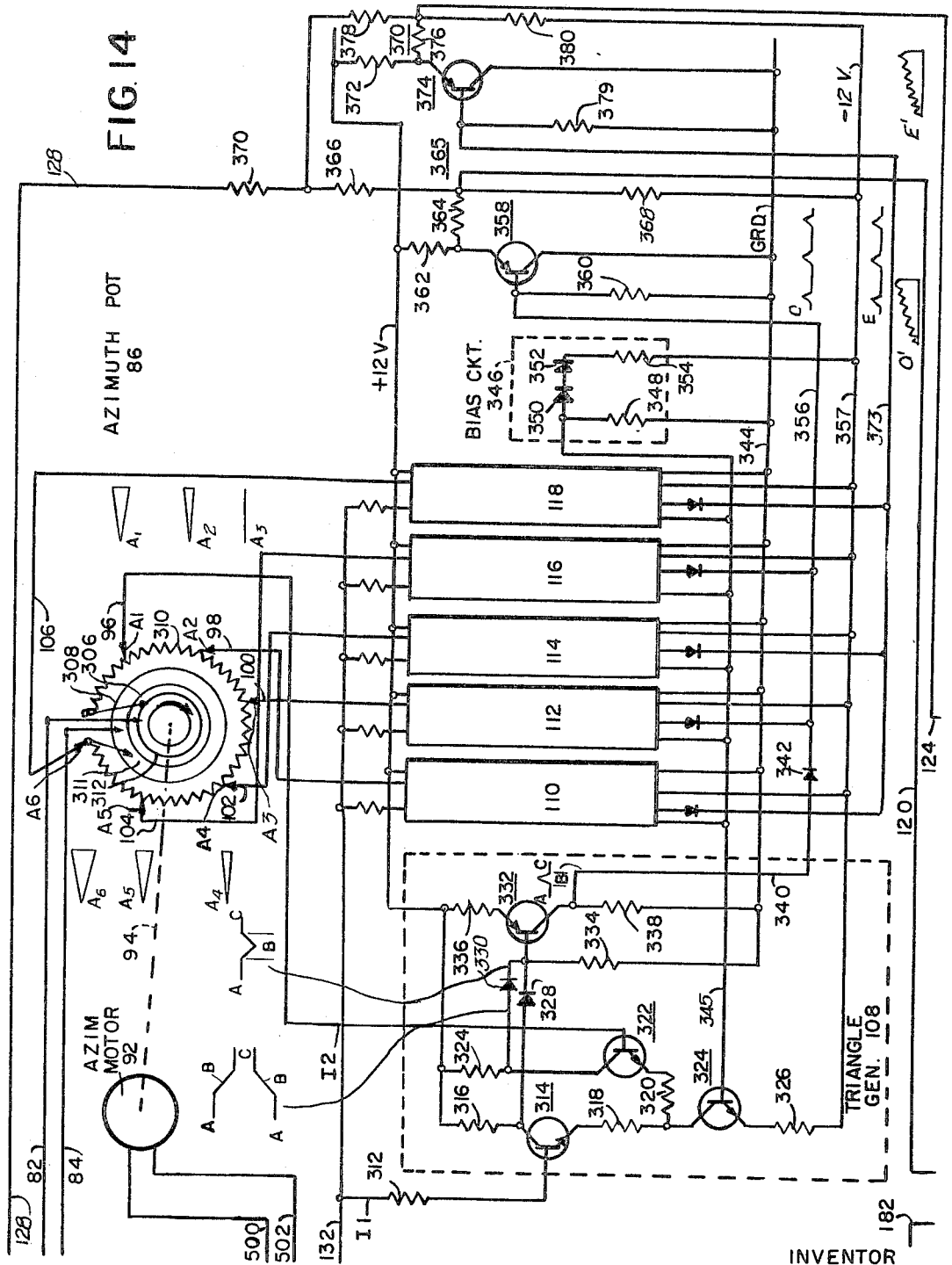

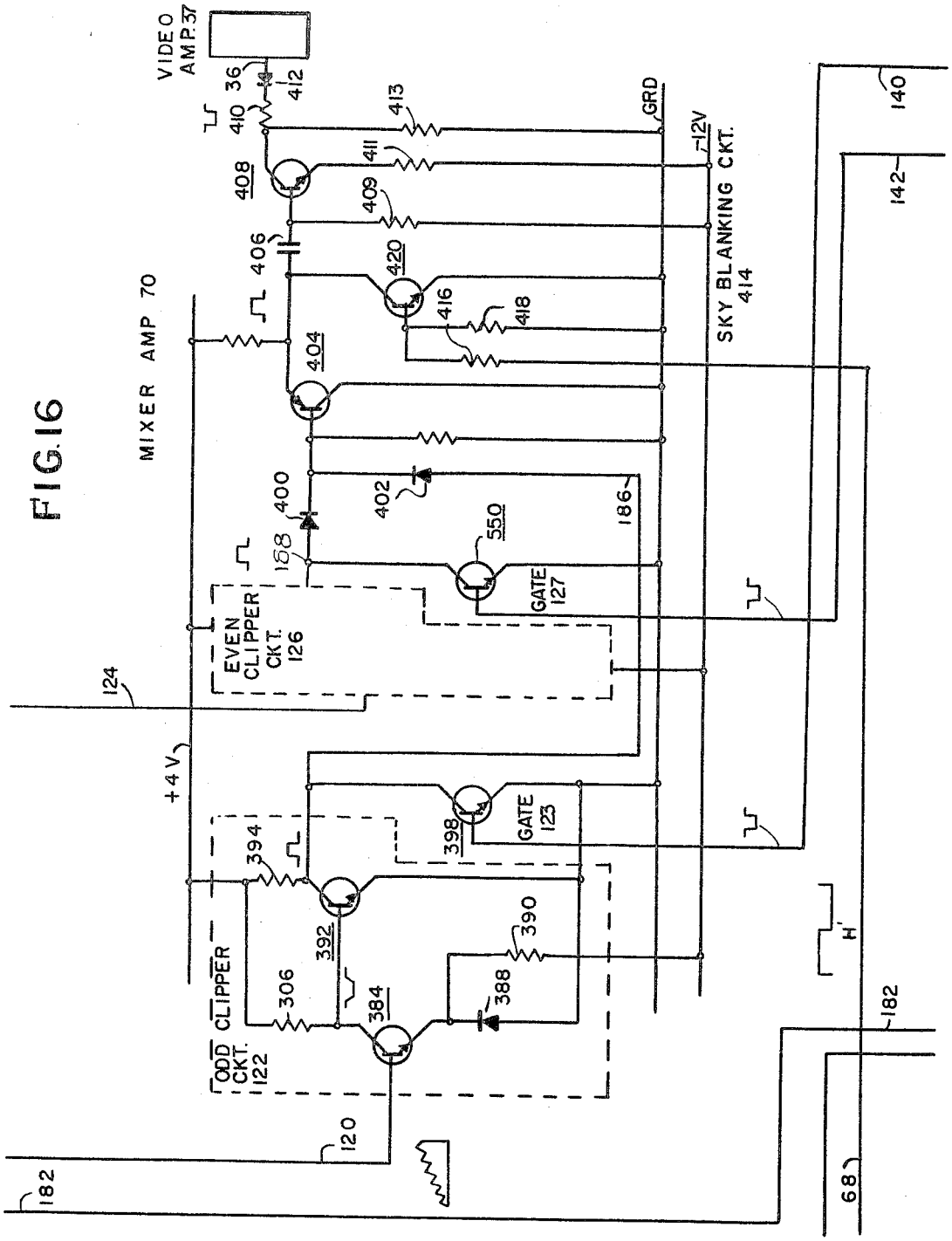

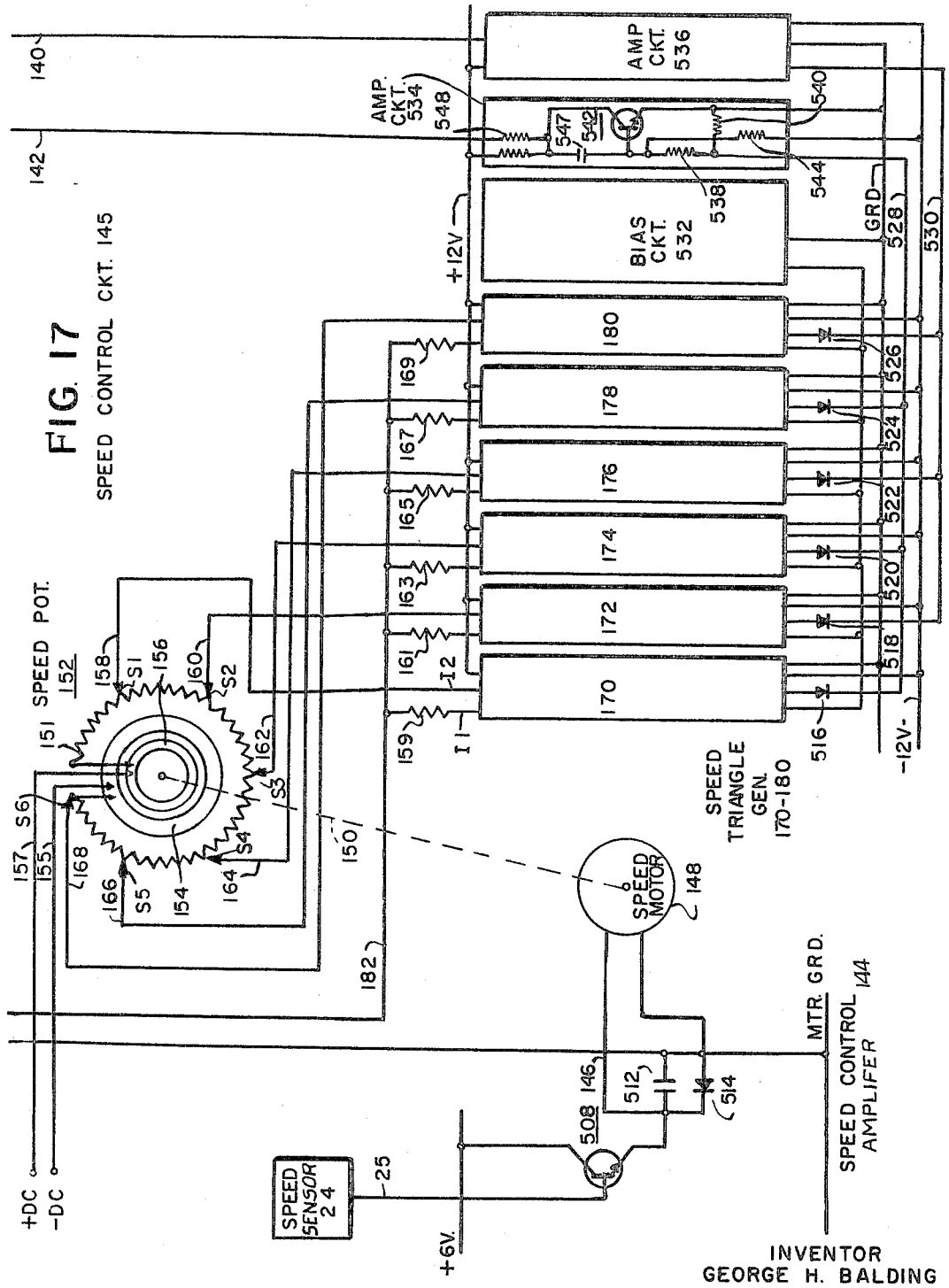

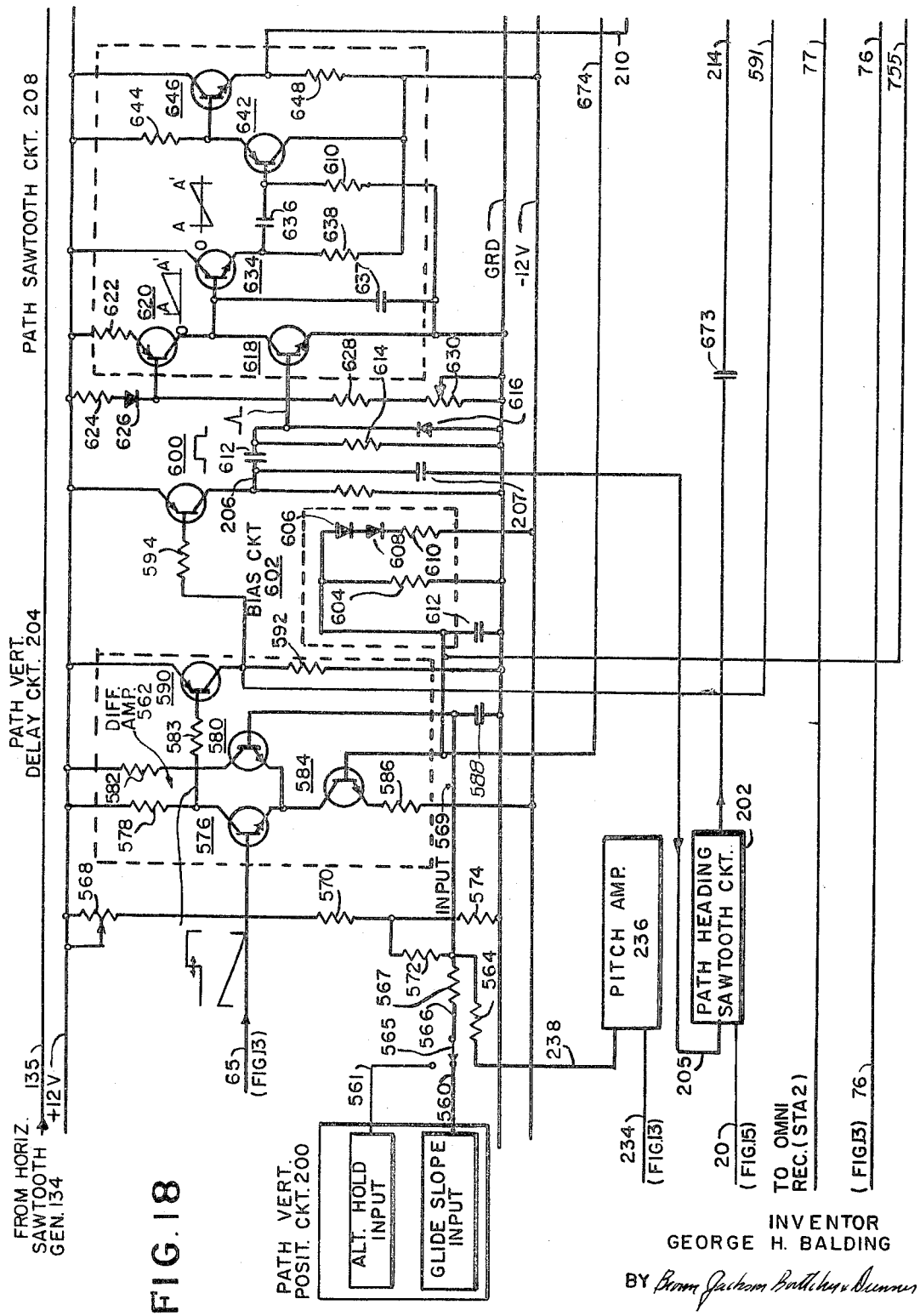

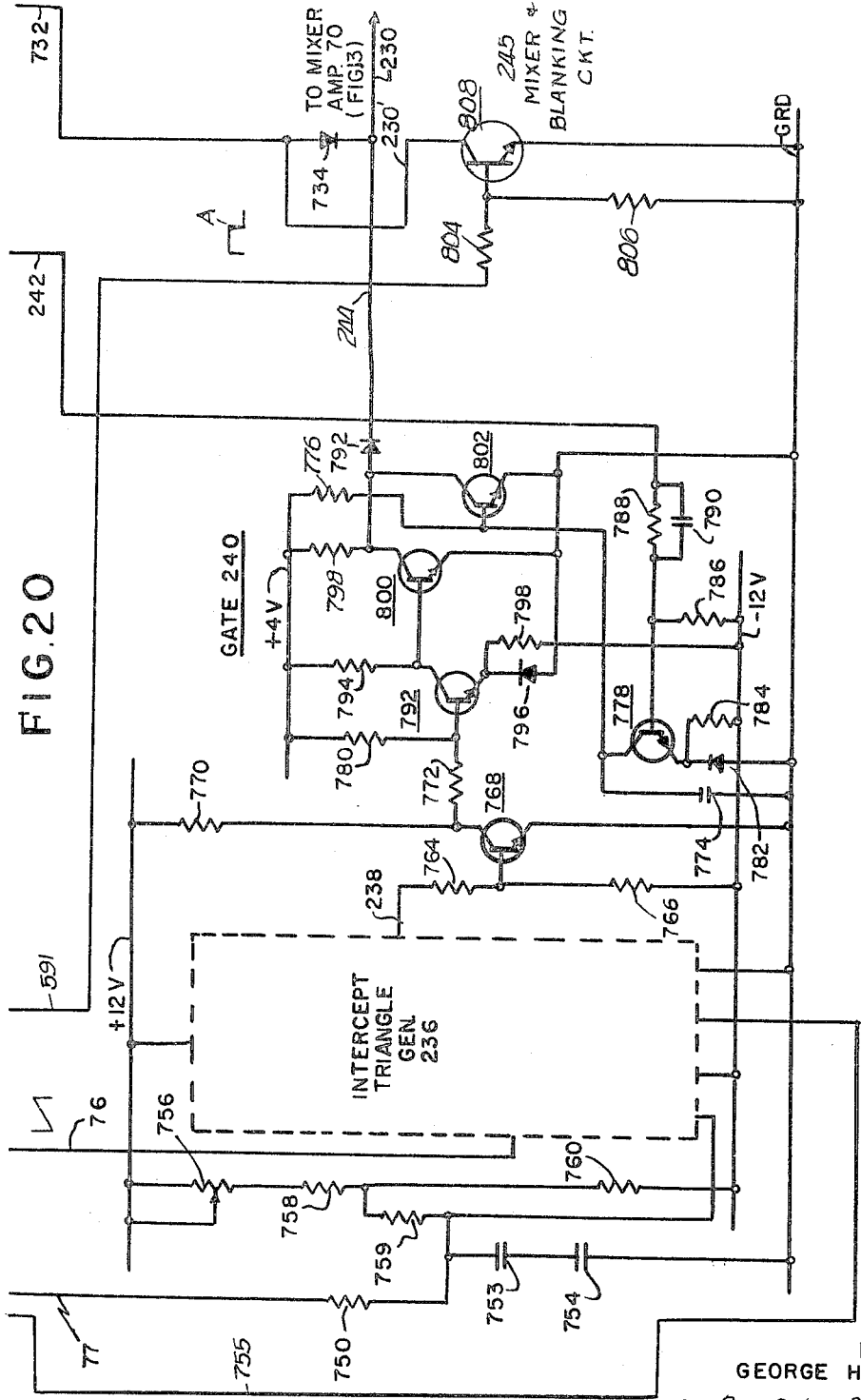

United States Patent Office 3,319,248
Patented May 9, 1967

3,319,248
ELECTRONIC VISUAL CUE GENERATOR FOR PROVIDING AN INTEGRATED DISPLAY
George H. Balding, Los Altos, Calif., assignor to Kaiser Aerospace & Electronics Corporation, Oakland, Calif., a corporation of Nevada
Filed July 16, 1965, Ser. No. 472,496
30 Claims. (Cl. 343—11)

The present invention is directed to a novel electronic generator circuit for providing an integrated visual display of attitude and command information for a mobile unit, such as an aircraft, submarine, or the like.

With the rapid and continued development of aircraft technology, the instruments which are used to provide information to the pilot relative to the aircraft attitude and navigational position have become increasingly numerous and complex. In addition, the increased speed at which aircraft now operate has substantially reduced the time available to the pilot for the readout and translation of such information into the required control of the aircraft.

As a result, during critical conditions of flight, such as during take-offs and landings, for example, the pilot is under continuous pressure in his attempts to observe the information on each of the vast number of dials and indicators, and to provide the proper reaction in the brief response time available, aircraft performance and safety clearly are involved and affected.

The problem is even more serious in flights made during weather in whchi visibility is limited, since the pilot in such cases must place full and complete reliance upon instrument information in maneuvering of the plane. Even pilots with utmost confidence in their instruments will agree that flight by instruments is not as comfortable and reassuring as flight with visual observation of the familiar real world references of sky, horizon and terrain. It has been observed, for example, that a pilot must have in the order of seventeen hours of instrument flying each month in order to maintain his proficiency in such manner of flight. Clearly a very small percentage of the pilots have such background and exposure.

As an aid to the solution of this fundamental problem, a novel electronic generator unit was developed which is capable of providing an integrated visual display of information to a pilot in a real world mode, which unit was disclosed in by Reissue Patent 25,756, which is assigned to the assignee of the present invention. Such display as presented to the pilot basically comprises a sky portion which meets with a well-defined horizon line, and a ground texture which extends from the horizon line to the bottom of the display. The ground texture includes elements which (a) emerge in a random pattern from the horizon, (b) move toward the bottom of the display to provide appearance of motion of aircraft over the ground, (c) move laterally or sideways on the display to indicate azimuth change or drift, and (d) change in shape with changes in pitch. The horizon line is displaced vertically with changes in pitch of the aircraft, and the entire display including the horizon line rotates as the plane is rotated about its roll axis. The relative area of ground and sky texture which appears on the display likewise changes with pitch.

Thus size, shape, shift and motion of all cues are presented in a realistic perspective display so that the pilot has the impression of looking at the real world in front of the aircraft through a window in the instrument panel. With such manner of display, the pilot can fly an aircraft during take-off, navigation, maneuver and landing modes as though actual visual contact were had with the real world.

Simultaneously with the provision of these basic aircraft attitude indications, the device also provides a path which is used as a flight director to indicate heading, speed and altitude commands. The command information is superimposed on the attitude display as a pathway having the shape of an inverted V, the apex of the path in normal flight of the aircraft being located at the horizon line. Positioning of the pathway horizontally and vertically provides heading and climb and dive commands respectively. The size of the pathway is varied to indicate command altitude. Command information as taught in my copending application having Ser. No. 378,892, which was filed June 29, 1964, may be obtained from a conventional compass, omni equipment, roll and attitude gyro equipment, ILS equipment and ADF equipment. The many uses of the novel contact analog and command unit are described in the patent and application above identified. Briefly stated, the contact analog cues tell the pilot what the aircraft is doing, and the commands tell the pilot what the aircraft should be doing.

The present invention is directed to a novel unit which is operative to provide a display for use in like manner and specifically to a novel circuit arrangement which is less expensive to manufacture and therefore available to an increased number of pilots, while yet providing the reliability and assistance achieved with my earlier unit. To this end, it is an object of the invention to provide a circuit arrangement in which differential amplifiers are utilized exclusively as pulse generators to provide the signals which generate ground texture elements in a novel manner, whereby modular construction of the circuitry is possible and a substantial reduction in cost is obtained.

Further, in that the unit has particular significance in providing added safety for pilots with minimum experience, it is desirable to provide a unit which is sufficiently compact to fit within the rather confined spaces normally available in conventional small aircraft. It is a specific object of the invention therefore to provide improved circuitry which effects a substantial overall reduction in the size of the electronic generator unit.

It is an additional object of the invention to provide a plurality of pulse generator circuits connected to operate successively at the vertical trace rate of the raster, and speed control circuitry controlled by input signals from the aircraft speed sensor varies the time of generation of the pulse generators in successive rasters to thereby provide movement of the ground texture elements across the display as a function of the speed of the aircraft, and means which control the ground texture elements on the display to move with motion perspective (i.e. with speed, the symbols move slowly adjacent the horizon and move quickly in their movement at the lower edge of the display).

It is yet another object of the invention to provide a new and novel circuitry for effecting generation of the ground texture elements in a semi-random pattern, without the expense and complexity of previously known random generator circuit arrangements.

It is an additional object of the invention to provide novel circuit means for generating an intercept line to indicate the position of the aircraft relative to a second preselected omni station while on a course to a first preselected omni station, the intercept line moving downwardly from the horizon to successively lower positions on the display until such time as the aircraft crosses the intercept line.

It is yet another object of the invention to provide a novel circuit responsive to signals from the attitude gyro to provide a rate-of-turn signal which controls the lateral displacement of the ground texture elements on the display at a corresponding rate.

It is a further object of the present invention to provide circuitry for generating signals which produce a flight path on the display comprised of only first and second marginal lines which form an inverted V, the apex of which is normally located at the horizon line, whereby a more intense showing of the lines may be achieved with resultant improved performance in high ambient light conditions.

It is a further object of the invention to provide circuitry for generating a flight path in which the ground texture portion which occurs in the area located between the two marginal edges of the path is viewable.

The foregoing objects and features of the invention and others which are believed to be new and novel in the art are set forth in the following specification, claims and drawings in which:

FIGURES 1 and 2 are pictorial representations of two representative displays provided by the novel electronic generator circuitry;

FIGURES 3 and 4 set forth in block form the component parts of the novel visual cue generator circuitry including the path generator circuitry;

FIGURES 8A and 8B are block diagrams showing the manner of relative arrangement of FIGURES 13–17 and 18–20 respectively;

FIGURES 11 and 12A–12C are a showing of the display provided with operation of the aircraft in the intercept mode;

FIGURES 13–17 set forth the specific circuits which effect generation of the signals for providing the basic cue display; and FIGURES 18–20 set forth the specific circuits for generating the signals which provide the path and intercept line displays.

GENERAL DESCRIPTION

Figure 1:
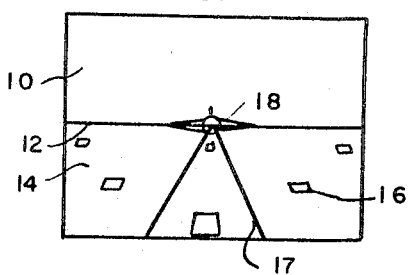
Figure 2:
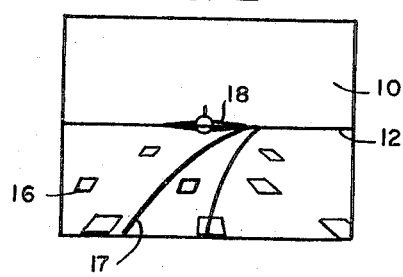

The integrated display of basic visual cues provided by the novel system of the invention on the display device to indicate the speed, altitude, pitch, roll and azimuth of an aircraft are shown in FIGURES 1 and 2.

With reference to FIGURE 1, the basic presentation includes a sky portion 10, a horizon line 12 and a ground texture 14. The sky portion 10 is of comparatively light intensity. The horizon line 12 comprises a sharp narrow black line which in level flight (as shown in FIGURE 1) extends laterally across the center of the display. The ground portion 14 which extends from the dark horizon line to the bottom of the display is initially of a darker intensity, and in the direction of the bottom of the display becomes progressively lighter in intensity. A plurality of ground texture elements 16 emanate from the horizon line 12 and move across the ground texture 14 in a semi-random pattern toward the bottom of the display to indicate flight of the aircraft relative to the real world.

As shown in FIGURES 1 and 2, each of the ground texture elements 16 in the present disclosure basically comprise a modified square, or trapezoidal figure, the vertical edges of which are slanted inwardly at the upper end in the manner of an element in perspective. In the further provision of a display in perspective, the elements 16 are caused to change in size as they emanate from the horizon line 12 and move across the display. That is, the ground texture elements 16 emerge from a point directly below the horizon line 12 as small elements which expand in size in their movement in the direction of the lower marginal edges of the display.

The emission of the elements from the horizon line 12 is at a rate which is related to the speed of the aircraft, the elements being emitted at a first rate at the slower speeds of the plane, and at a correspondingly increased rate as the speed of the plane increases. As will be shown, the ground texture elements 16 are also moved laterally across the screen, such movement being at a rate which is related to the rate of turn of the aircraft. In certain embodiments, the spacing between the elements is varied laterally and vertically to represent altitude change.

With maneuvering of the aircraft, the horizon line 12, sky portion 10 and ground portion 14 are altered on the display in a manner to represent the corresponding change which would be viewed by the pilot in the real world. In the maneuvering of the aircraft about its roll axis, as for example, with the banking of the aircraft in the execution of a turn, the horizon line 12 is displaced from the horizontal through an angle which is consistent with the degree of bank of the aircraft, and the ground texture 14 and sky portion 10 are rotated with the horizon line. The nature of the presentation in such condition of flight is shown in FIGURE 3 of the Reissue Patent Re. 25,756 which issued April 6, 1965 to G. H. Balding, and was assigned to the assignee of this invention.

In a similar manner, with changes in pitch of the aircraft, the horizon line 12 must be displaced upwardly or downwardly on the display. It is apparent that as the aircraft is pitched downwardly to an increasingly steeper attitude, the horizon line 12 will move progressively toward the top of the display, and the amount of ground texture 14 appearing on the display will be correspondingly increased. At such time as the plane is in a true vertical dive, the entire display would be comprised of ground texture 14. In a climb, the horizon line 12 moves downwardly to a position related to the pitch of the aircraft, and a correspondingly increased portion of the display will consists of sky texture 10.

The basic cues described above which provide an indication of relative speed, altitude, pitch, azimuth and roll of a mobile unit, such as an aircraft, are supplemented as shown in FIGURES 1 and 2 by superpositioning of a flight path 17 on the display to indicate a course of flight for the pilot. As shown in FIGURES 1 and 2, the flight path 17 of the present embodiment comprises a path display having a wedge-shape outline, the marginal edges of which are sharply defined by discrete white lines. The portion of the path extending between the marginal path edges is in effect transparent so that the ground texture 14 and elements 16 are visible below the path 17 in the same manner as outside the path. In effect, therefore, the path comprises two white relatively narrow lines which are in the shape of an inverted V, the apex of which represents infinity. Reticle 18 permanently marked on the face of the display provides a reference point for the path apex.

The showing of the flight path 17 on the display will vary in accordance with the information to be displayed. Thus in the showing of FIGURE 1, the apex is shown as being located at the horizon line. As will be shown for various conditions of flight, the apex (a) may be locked to the horizon line; (b) may be moved above the horizon line to indicate one desired path; or (c) may be moved below the desired line to indicate a further alternative path. In yet other displays, as for example in FIGURE 2, the apex of the path may be curved to the left or the right to portray a changing course for the pilot.

The novel path, as will be shown, may be earth stabilized or aircraft stabilized. In the aircraft stabilized condition, the end of the path is adjusted to different positions to indicate the particular direction in which the aircraft is to be turned, and the end of the path is moved upwardly or downwardly to indicate the change in pitch which is required. In the ground stabilized presentation, the near end of the path is shifted laterally for the purpose of indicating that the aircraft is moving off the track, and the far end of the path is moved laterally to indicate that the aircraft is moving off the desired heading.

In the embodiment described herein, the apex of the flight path is moved in relation to the horizon line 12.

With a command to increase the pitch of the aircraft upwardly, for example, the apex of the path will be moved above the horizon. If a pitch change is effected at this time, the path apex will be moved to a correspondingly different position on the display while in the same displaced position relative to the horizon line. In certain embodiments and uses, separate inputs are provided to the flight path control equipment and to the horizon generator to provide individual movements of the path apex and the horizon line.

The manner in which other variations occur in the display as a result of changes in position of the aircraft flight are described in more detail in the above identfied Reissue patent, and reference is made thereto for such further descriptions.

BASIC CUE GENERATION

The electronic visual cue generator 15 (FIG. 3) for generating the waveform signals which provide such display basically comprises electronic circuitry which is operative responsive to signal information representative of the aircraft condition to generate waveforms which as applied to a suitable display device such as, for example, a cathode ray tube, result in an integrated presentation of such information in a single picture. The more basic cues for which input signals are provided include aircraft speed, altitude, pitch, roll and azimuth. As noted above, changes in the value of such signals result in changes in the waveform output of the circuit and a corresponding change in the sky, horizon and ground portion on the display.

The electronic generator 15 for providing the basic display cues, as schematically shown in FIGURE 3, has a plurality of input circuits 20, 21, 23 for connection to information sources including an attitude gyro 19 which provides signals related to the bank angle of the aircraft over path 20 to the roll servo motor 40 and over path 21 to azimuth rate generator 88; a pitch sensor 22 which provides a signal over path 23 representative of the pitch of the aircraft; and a speed sensor 24 which provides direct current signals over path 25 representative of the speed of the aircraft.

The sensor devices 19, 22 and 24 are conventional, commercially available aircraft units. If the display unit is to be used with simulator equipment, manually adjustable means, such as a variable potentiometer, having a control knob adjustable to different positions to provide different output potentials, may be used to provide signals indicative of different flight conditions, such as pitch, roll, heading, speed and the like. Alternately, data computer and memory equipment may be connected to provide input signals of different values to represent the different conditions. Other types of equipment for providing input signals to the generator system to represent different conditions of the airborne unit will be apparent.

Generation of waveforms which result in a common display of the different cues is controlled by a timing generator 28 which basically comprises a first oscillator operative to provide horizontal sync pulses at the rate of 15,750 c.p.s. and a second oscillator for providing vertical sync pulses at the rate of 62 c.p.s. The horizontal and vertical sync output pulses of the timing generator 28 are operative in the manner of a television timing generator to control a conventional deflection circuit 30 in the energization of a deflection yoke 32 to provide a raster on a cathode ray tube 34. As will be shown, the waveform signals generated by the novel electronic generator circuit 15 are extended over conductor 36 to the cathode gun of the cathode ray tube 34 to modulate the beam in its trace of the raster, and thereby to provide the desired display.

The timing generator 28 differs from the conventional television line generator in that the oscillators are free-running with the vertical rate slightly higher than the conventional rate of 60 c.p.s. The horizontal and vertical sync output pulses from generator 28 are transmitted over output conductors 61, 62 to the different circuits of the waveform generator, as will be shown, which use such pulses as reference pulses in the generation of the waveforms which provide the desired cues.

With reference first to the attitude gyro unit 19, the signals representative of the roll attitude of the aircraft are provided over path 20 to a servo motor 40 which in turn is coupled over a gear box 42 to a yoke 32 which is mounted for rotation about the neck of the cathode ray tube 34. With rotation of the aircraft about its roll axis, signals coupled over path 20 to the motor 40 result in a corresponding mechanical rotation of the yoke about the tube neck, and thereby rotation of the display on the screen of the tube.

A horizon generator 44, which may be of the type set forth in the above identified Reissue Patent 25,756, generates the waveform which traces the horizon line 12 (FIG. 1) across the display at a position consistent with the pitch of the aircraft. As shown in FIGURE 3, the horizon generator 44 is controlled by pitch representative signals received over conductor 23 from pitch sensor 22 and sawtooth signals received at the vertical rate over conductor 66 from a vertical sawtooth generator 64 (which may be of the type set forth in the above identified reissue patent) and which in turn is controlled by the vertical sync pulse output on conductor 62 from the timing generator 28.

As set forth in the above identified reissue patent, the horizon generator 44, as energized, provides a pulse having a sharp leading edge and a curved trailing edge over path 69 to the output of mixer amplifier 70 for coupling over path 36 to the electron beam gun on cathode ray tube 34. The time of generation of the leading edge of the pulse in a raster scan is varied to correspondingly adjust the location of the horizon line to different positions on the display, such variations being effected by changes in the input signal provided by the pitch sensor 22 over path 23 to the horizon generator 44. The trailing portion of the output wave of the horizon generator 44 as coupled over conductor 69 to the cathode ray tube 34, results in a ground texture 14 of less and less intensity toward the bottom marginal edge of the display.

GROUND ELEMENT GENERATOR

As noted above ground texture elements 16 which move in a semi-random pattern from the horizon line to the bottom of the display are generated continuously as shown by FIGURES 1 and 2. Inputs used to achieve motion of this presentation are provided by the horizon generator 44 and attitude gyro 19. The general manner in which these inputs are processed and displayed will now be discussed.

With reference to FIGURE 3, the horizon generator 44 is operative to provide a sync signal at the time of the generation of the leading edge of each horizon line pulse, the sync signal being transmitted over path 72 to a vertical sawtooth generator 74 which, in response thereto, provides a positive-going sawtooth pulse over path 76 to mixer circuits 365, 370 and to an intercept triangle generator 237 (FIG. 4) and a negative-going sawtooth pulse over path 78 to a sawtooth bias circuit 80. It will be apparent that the sawtooth pulses occur at the vertical rate of the timing generator 28, and that the generation thereof is initiated at the time the leading edge of the horizon line pulse by horizon line generator 44 is generated in each raster.

As will be shown, the sawtooth bias circuit 80 provides in part a direct current bias signal over paths 82, 84 which determines the spacing between the rows of moving elements provided on the ground texture in the display. The output of the sawtooth bias circuit 80 over path 82 comprises a positive-going sawtooth which has been mixed with a D.C. bias signal, and over path 84 comprises a negative-going sawtooth signal which has been mixed with a constant value negative bias signal.

Paths 82 and 84 are connected to the inputs of azimuth pot 86. As will be shown, the azimuth pot 86 is a mechanical device which comprises a substantially circular resistance element, the two terminal ends of which are connected to paths 82, 84 respectively. A rotatable member (not shown in FIGURE 3) connected to shaft 94, carries six wipers each of which is in contact with the resistance element 60 degrees from the next adjacent wiper. Each wiper will thus sense a different voltage signal on the resistance element, and as will be shown, each signal determines the horizontal position of a different one of the vertical rows of ground texture elements 16 (FIG. 1) on the display.

Rotation of shaft 94 results in rotation of the wipers on the azimuth pot and thereby lateral adjustment of the rows across the display. Rotation of the shaft 94 is controlled by azimuth motor 92 which is in turn operated by input signals received over path 90 from azimuth ratio generator 88, and path 21 from the aircraft directional gyro 19. As will be shown, motor 92 is caused to rotate only when the aircraft banks and at a rate which is determined by the rate of turn of the aircraft, whereby the lateral movement of the ground elements 16 (FIG. 1) laterally across the display is at a rate which is consistent with the rate of turn of the aircraft.

The signal outputs which are derived by the six wipers 96, 98, 100, 102, 104 and 106 on the azimuth pot 86 are fed to individual triangle generators 108–118. Each of the triangle generators 108–118 has a second input connected over path 132 to the output of a horizontal sawtooth generator 134 which is in turn controlled by the horizontal sync pulse output received over path 61 from timing generator 28.

It will be seen from the foregoing description that each triangle generator, such as 108, for example, will receive a sawtooth signal at the horizontal rate over input path 132, and a variable sawtooth signal at the vertical rate over input path 96, it being recalled that the vertical sawtooth over path 96 is not initiated in a raster trace until such time as the horizon line is generated. The horizontal sawtooth signal is received over path 132 during each horizontal line trace and is used to generate a triangular shaped waveform over conductor 356. The variable vertical sawtooth determines the position of the triangles horizontally on the screen. The outputs of odd generators, i.e., the first, third and fifth generators are connected over path 356, mixer 365 and path 120 to odd clipper circuit 122, and the signal outputs of the even triangle generators (second, fourth and sixth) are connected over path 373; mixer 370, and path 124 to the even clipper circuit 126.

As indicated above, the bias provided by sawtooth bias circuit 80 to the azimuth pot 86, and the spaced positions of the wipers on the azimuth pot 86 results in bias signals over the paths 96–106 which are of correspondingly different values and polarity. As a result thereof, the triangle generators 108–118 operate in timed sequence as the horizontal sawtooth waveform is received during each line trace of the raster. Since the wipers connected to conductors 96–106 rotate, a different triangle generator may be operated first in a sequence. Stated in another manner, the conductors connected to the wiper having the most positive bias signal will operate first as the horizontal sawtooth signal is received, and the other triangle generators will operate in sequence thereafter.

As noted above, the output of the odd numbered timing generators is connected to the odd clipper circuit 122, and the output of the even numbered timing generators is connected to the even clipper circuit 126. Each of the clipper circuits 122, 126 also has an input circuit connected over path 128, mixers 365, 370 and paths 120, 124 to one output of the sawtooth generator circuit 74 which, as noted above, initiates generation of a vertical sawtooth as the trace of the horizon line is started in a raster trace.

It is first assumed for purposes of explanation, that the triangle generator 108 is operated first during each horizontal line sweep, and the output thereof is coupled over mixer 365 to odd clipper circuit 122. The vertical sawtooth waveform is initiated as the horizon line is generated, and during approximately the first line trace thereafter, the combined signals are of a value to exceed the preset value of clipper 122. If the resultant signal were applied over gate 123, path 186, mixer 70 and path 36 to the gun of cathode ray tube 34, the signal would result in the trace on the display of the apex of a wedge shaped path.

Figure 5:
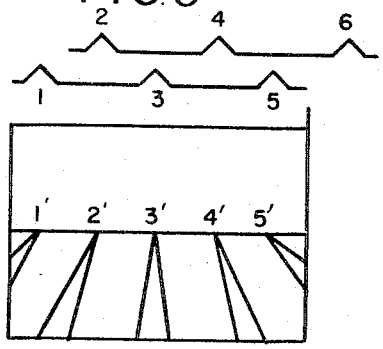
FIGURES 5, 6 and 7 illustrate waveform outputs of the circuitry which are used to provide the ground texture elements shown in FIGURES 1 and 2.

During successive horizontal line traces, the combined signals would exceed the bias level for increasing longer periods, and the segments traced during such lines on the raster become increasingly longer to provide a wedge shaped path which extends downwardly from the horizon line in a skewed manner as shown by the path identified by numeral 1. In FIGURE 5, the skewing is determined by the value of the vertical sawtooth signal received from bias circuit 80. In a similar manner, the outputs of the successive ones of the triangle generators 108, 110, 112, 114, and 116, and (in the example of FIGURE 5) if applied to the gun would result in a total of five paths on the display. As will be shown, because of the rotation of the pot 86 normally only the signal output of five of the six generators is effective in the display.

In brief summary the different D.C. bias values provided by the sawtooth bias circuit 80 to the triangle generators 108–118 causes sequential operation of the triangle generators 108–118, and thereby spacing between successive ones of the paths, which would appear on the display if applied thereto. The skewing of the successive paths results from the positive and negative sawtooth waveforms coupled respectively over the paths 76, 78 to bias circuit 80, and paths 82, 84 to the pot 86. The bi-directional arrow in the illustration of FIGURE 5 indicates the direction of movement of the paths which would occur as the azimuth pot 86 is rotated in either direction in response to the signals received over heading input path 21.

The output signals of the odd and even clippers 122, 126 are fed respectively over paths 136, 138 to gate circuits 123 and 127. Gate circuits 123 and 127 each have further input paths 140 and 142 respectively over which signals are received for the purpose of breaking up the signals which would provide the paths, shown in FIGURE 8, into the individual ground texture elements 16, shown in FIGURES 1 and 2.

The circuitry for providing signals over the paths 140 to 142 to the gate circuits 123, 127 basically comprises a speed sensor 24 and a path 25 over which signals representative of the speed of the aircraft are received. The input signals of sensor 24 are extended over path 25 to speed control amplifier 144 which provides amplified versions of the input signals over path 146 to motor 148. As will be shown in more detail, motor 148 is mechanically coupled over drive means 150 to a speed pot 152.

Speed pot 152 is identical in construction to azimuth pot 86 and includes input paths 154, 156 over which positive and negative direct current potentials are coupled to the end terminals of a circular resistance member, and six wipers spaced at sixty degree intervals on the pot for extending signals of correspondingly different values over paths 158–168 to the inputs for correspondingly different speed triangle generators 170–180. The different value signals input over paths 158–168 to the different triangle generators 170–180 result in spacing time-wise of the triangle generator operation. Thus, if by reason of the position of pot 152, triangle generator 158 is energized to provide the first pulse, the successive pulses provided by triangle generators 172–180 will be spaced in time by an increment which is determined by the separation of the six wipers on the speed pot 152.

Figure 6:
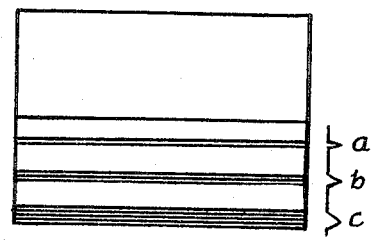

Each triangle generator 170–180 is additionally connected over path 182 to the output of a differential circuit 184 which differentiates the negative-going sawtooth signal which is received over paths 78 and 186 from the vertical sawtooth circuit 74 at the vertical rate of the raster trace. It will be recalled that generation of a vertical sawtooth waveform is initiated by circuit 74 as the horizon line is generated in a raster. As shown in FIGURE 3, the resultant waveform provided by differentiating circuit 184 is nonlinear, and as will be shown the nonlinear curve results in the provision of a perspective motion of the ground texture elements 16 (FIG. 1) as generated on the display because of increased spacing between each. That is, the triangle generators 170–180 are controlled to operate in sequence during the period which occurs in the trace of the raster from the horizon line down to the bottom of the display, and the width and spacing of the base of the successive triangles generated during such period increases as a result of the slope of the waveform shown adjacent path 182. Assuming for purposes of example, that triangle generator 170 is operated immediately after the occurrence of the sawtooth illustrated in FIGURE 6, the triangle waveform output from circuit 170 will have a relatively narrow base, and succeeding triangle waveforms generated by successive ones of the triangle generators will provide triangular shaped waveforms of greater amplitude and therefore an increasingly wider base. The horizontal lines shown in FIGURE 6 illustrates, time-wise, the periods in a raster trace in which the outputs of triangle generators 170, 172, 174 (a, b, c) might be effective for a given setting of pot 152.

Triangle generators 170–180 are again divided into even and odd generators (2, 4, 6 and 1, 3, 5, respectively). The output of the odd generators is coupled over path 140 to gate circuit 123, and the output of the even generators is coupled over path 142 to gate circuit 127. If the output of the triangle generators 170–180 were mixed with the vertical sawtooth 76 and were fed over a clipper, such as 122, for example, to the gun of the cathode ray tube 34, the resultant display would have comprised five or six horizontal lines of the type shown in FIGURE 6 (only three in level flight). However such signals are used to control operation of gate circuits 123, 127 which are normally biased off to prevent conduction of the output signals of the clipper circuits 122, 126.

Figure 7:
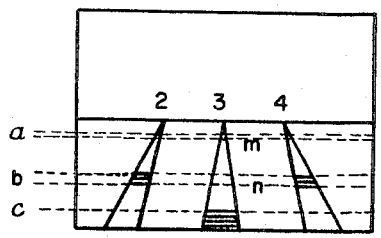

Briefly, under the conditions assumed, the second triangle generator 110 of the azimuth generator would have provided the second path. As a speed triangle generator of the even group, such as 172, provides an output signal over path 142, the gate circuit 127 is caused to conduct for the period that the triangle waveform provided by speed triangle generator 172 exceeds the preset bias level of the gate circuit 127. As shown in FIGURE 7, as a result thereof, the gate circuit 127 is open, and the signals provided by the clipper circuit 126 (which would have normally provided a full path as shown in FIGURE 5) are conducted only for such periods as both signals are effective. Such signals result in the generation of the ground texture element "2b" as is shown in FIGURE 7. In a similar manner, when the fourth triangle generator 114 is operated in each horizontal line trace during the period that the speed triangle generator 172 maintains the gate circuit 127 open, the ground texture element "4b" shown in FIGURE 7 will be generated.

It will be apparent therefrom that ground texture element a1 would be provided in the assumed signal input by coincident operation of generators 108, 170; ground texture element a3 would be generated by generators 112, 170, etc. As the motor 148 is continuously rotated in response to a speed signal input, which occurs whenever the aircraft is in flight, the time of generation of the pulses by speed pot 152 will advance to a correspondingly different time during successive rasters and as time periods a, b, c (FIG. 6) occur at later times in the raster, the texture element generated thereby appears to move downwardly on the display toward the lower marginal edge. Further, as will be shown, as the wiper on pot 152 which generates the time period a advances on the pot, the time period a increases and the element provided thereby grows in size. Thus when the wiper which produces element a1 in FIGURE 7 moves to the positions occupied by the wiper producing element b2 in FIGURE 7, the element a1 will be the size of element b2.

The outputs of the gate circuits 123, 127 are fed respectively over paths 186, 188 respectively to the input of amplifier mixer circuit 70 and, after amplification, are fed over path 36 to the electron beam gun of tube 34. The polarity of the output pulses provided by the amplifier mixer 70 is such that the gun is turned off during the period of the triangle generator output which results in the generation of the ground texture pulses (i.e., time a2, b2, etc. in FIGURE 7 for example).

FLIGHT PATH GENERATION

As indicated hereinabove a flight path is superposed on the display as a further aid to the provision of flight direction presented to the pilot. As shown in FIGURE 1, the flight path basically comprises a path having a wedge shaped outline defined by a marginal white line, the portions between the marginal edges being blank so that the ground background and the ground texture symbols which might occur in such portion are visible to the pilot.

With reference to FIGURE 4, the circuitry basically comprises a path sawtooth circuit 208 which has a first input 206 over which sawtooth signals are received at the vertical trace rate of the raster, a path delay circuit 204, one input path 65 of which is connected to the output of the system vertical sawtooth generator 64 (FIG. 3). As will be shown, path delay circuit 204 is controlled by path vertical positioning circuit 200 to adjust the time of generation of the path sawtooth output of circuit 208 during a vertical trace to different values. Path vertical positioning circuit 200 is connected to different inputs for different uses of the system including glide slope input, altitude hold input, etc.

A path triangle generator circuit 212 has a first circuit 135 over which sawtooth waveforms are received from horizontal sawtooth generator 134 (FIG. 3) at the horizontal trace rate of the raster, and a second input 214 over which sawtooth waveforms are received from path heading sawtooth circuit 202 at the vertical rate of the raster. Path heading sawtooth circuit 202 is controlled by signals received over path 20 from the directional gyro 22' (FIG. 4) (which signals indicate the heading of the aircraft) and over path 205 from the path vertical delay circuit 204, which signals indicate the delay desired in the vertical trace.

The output path 210 of the path sawtooth circuit 208 (which as will be shown, comprises a positive going sawtooth waveform over path 210 at a time in each raster trace determined by path vertical positioner circuit 200) and the output of path 216 of path triangle generator circuit 212 (which comprises a triangle shaped waveform which occurs at a time during each horizontal line trace of the raster which is determined by path heading sawtooth circuit 202) are extended to mixer circuit 217 for coupling over paths 220, 224 to a first clipper circuit 222 and a second clipper circuit 226.

Figure 9:
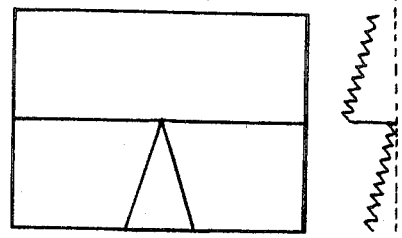
FIGURES 9 and 10 are illustrative showings of the waveforms used in generation of the novel path.

As will be set forth in more detail hereinafter (and the description in the above identified reissue patent), as the combined output of the sawtooth circuit 208 and the triangle generator circuit 212 exceed the bias value set on clipper circuit 222, the apex of the path will be generated. In the example of FIGURE 9, the combined value of the two outputs occurs at the time the horizon line is generated so that the apex of the path and the horizon line are generated from FIGURE 9 so that as the raster progresses, and the amplitude of the sawtooth output of the path sawtooth circuit 208 increases, a greater portion of the triangle wave shape output from triangle generator circuit 212 is passed through the gate, and accordingly the duration of the resultant pulse output by clipper circuit 222 increases as successive line traces occur (see waveform adjacent conductor 230). Thus, as the trace approaches the bottom edge of the display, the wider triangles generated during successive line traces result in longer traces on the display screen, and a flight path of increasing width at its base.

According to the invention, the center portion of the path is blanked out so that the ground background, and such ground texture elements as might otherwise be hidden by the path, will be visible except for the portions blanked by marginal edges of the path (see FIGURES 1, 2 for example). Such arrangement is achieved by providing a second clipper circuit 226 which is biased so that the circuit will not respond until the combined signal output of sawtooth circuit 208 and triangle generator circuit 212 is greater than that required to effect an output by the first clipper circuit 222.

Figure 10:
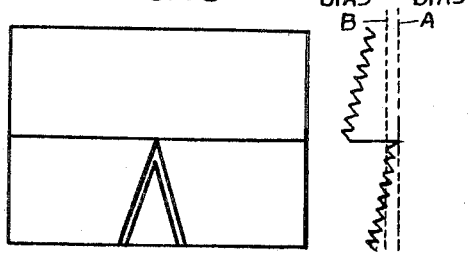

Stated in another manner, with reference to FIGURE 10, the bias line B for the second clipper circuit 226 is shifted to the left of the bias line A for the first clipper circuit 222 so that the output of the second clipper circuit if applied to the display tube would be a path inside the first path. However, the output of the second clipper circuit 226 is instead connected over path 228 to gate 223 to cut off the gate 223 during the period that the second or inner path is being generated by clipper circuit 226, and in such manner, only the marginal edge portion of the first path generated by clipper circuit 222 will appear on the screen.

The position of the path 17 (FIG. 1) thus generated, including the path vertical position, the position of the path apex and the path heading are adjustable to different positions in response to the receipt of signals requiring such position changes. The circuits for effecting such adjustments including path verical position circuit 200 and vertically delay circuit 204 are briefly described hereat.

The path vertical delay circuit 204 receives signals which indicate variations in the pitch of the aircraft to adjust the position of the path along the vertical dimension. That is, the output of pitch sensor 22 (FIGURE 3) is connected over conductor 234 to pitch control amplifier 236 and over path 238 to the path vertical delay circuit 204. As the pitch input signal is changed, the position of the horizon line and the vertical position of the path are varied together. If it is desired to vary the path away from the horizon, separate signals are applied by the path vertical positioning circuit 200 to the path vertical delay circuit 204, whereby the path clipper sawtooth 208 is delayed or advanced in the raster trace, as the case may be, and the vertical position of the path is adjusted to a correspondingly different position on the display. One example of an input which can be applied to the path vertical positioning circuit 200 is set forth in my copending application which was filed June 29, 1964.

In a similar manner, the path apex is adjusted to different positions to indicate different headings as shown in FIGURES 1 and 2. Such change is effected by providing a D.C. signal which changes in amplitude and polarity to indicate the different positions to which the apex of the path is to be moved, the variable signals indicating a change in the aircraft heading being provided over input path 20 to the path heading sawtooth circuit 202. The time of generation of the sawtooth waveform by the path heading sawtooth circuit 202 is determined by an input signal received over path 205 from path vertical delay circuit 204 (i.e., the path vertical delay circuit 204 provides such signal at different times in a raster which are determined by the vertical position of the path).

The resultant sawtooth waveform signal output over path 214 which varies in polarity and amplitude with the input signals on paths 20, 205 is extended over path 214 to path triangle generator circuit 212. Additionally, triangle generator circuit 212 is controlled by a horizontal sawtooth output on conductor 135 from sawtooth generator 134.

The triangle generator circuit 212 generates a triangle waveform in each horizontal line trace of the raster at a time determined by the input signal received over path 214. Changing polarity of the waveform signals from circuit 202 to triangle generator circuit 212 displaces the path apex laterally in different directions from the center of the display. The extent of displacement is determined by the amplitude of such signal. Additionally, by providing a nonlinear sawtooth output from path heading sawtooth circuit 202, the path will be curved as illustrated in FIGURE 2.

INTERCEPTOR CIRCUIT

According to a further novel feature of the present invention, the equipment is operative to provide "line-of-position" information or zero angle indication of bearing to a station for omni intersection (known in the art as an intercept signal). Such signal is well known in the art and assists the pilot in determining the aircraft position.

In the actual referencing of the position of the aircraft, the bearing of two different omni stations 112 (FIG. 11) is taken, and the bearing to the second station 2 is referred to as the intercept bearing 1B. In the present arrangement, the intercept line 12 is arranged to be shown on the display as a white line which will originally appear parallel and adjacent to the horizon (FIG. 12A). With advance of the plane in the direction of the first station 1, the line IL will move downwardly towards the bottom edge of the screen (FIG. 12B). At such time as the line reaches the bottom edge of the screen (FIG. 12C), the pilot knows that the aircraft has arrived at the intercept position (FIG. 12).

The circuitry for providing such display of the intercept line basically comprises an input circuit 77 (FIG. 4) connected to the output of conventional direction finder equipment, which detects omni signals indicating the intercept bearing, to provide such signals to a triangle generator circuit 237. A second input circuit 76 for triangle generator circuit 237 extends the positive-going sawtooth output of the vertical sawtooth circuit 74 (FIG. 3) to triangle generator 236. It will be recalled that the vertical sawtooth provided by circuit 74 is initiated at such time as the horizon line is traced, and accordingly the initial position of the intercept line IL will occur at slightly below the horizon line. As the value of the D.C. input signal from the omni signal changes with movement of the aircraft along the illustrated path, the intercept line IL advances further and further towards the bottom edge of the display.

Briefly, the triangular shaped pulse output of delay circuit 237 is extended over path 238 to gate 240 and to the mixer-amplifier 70 (FIG. 3) for the display tube 34 over paths 244, 230. The time of occurrence of the pulse during the vertical trace determines the location of the intercept line IL on the raster, and the width of the pulse determines the width of the intercept line IL which is traced on the display.

In addition, gate 240 has a second input 242 which is connected to the output of the second clipper circuit 266 which closes the gate 240 so that the trace of the portion of the intercept line IL which extends between the marginal edges of the path will not occur on the display.

DETAILED CIRCUIT DESCRIPTION

For purposes of simplifying the explanation of the detailed circuitry, the portions of the circuitry which are known, or have been explained in detail in the above identified reissue patent and application, are shown in block form with specific reference being made to the signal output which is provided therefrom in the normal mode of operation.

Roll cues

With reference first to FIGURE 3, it will be recalled that the timer generator 28 is operative to provide horizontal sync pulses over horizontal output conductor 61 at the horizontal rate of the raster which, in the present arrangement, is approximately 15,700 c.p.s. and vertical sync pulses over conductor 62 at the rate of 62 c.p.s. The 62 c.p.s. rate is used to eliminate flicker which is noticeable to the eye when a 60 c.p.s. is used. With the coupling of such signals to a conventional deflection circuitry 30 for a standard cathode ray monitor unit 34 with a rotating yoke 32, the raster is caused to be traced at the 62 c.p.s. rate on the target area of the cathode ray tube 34. As described above and in the above identified patent, with the input of roll signals over path 20 to motor 40, gear drive 42 rotates the yoke 32 about the neck of the tube, and the presentation on the display area is correspondingly rotated. In such manner, rotation of the aircraft about its roll axis is presented on the display.

Horizon line generator

As noted in the general description, the vertical sync signals are also provided by timing generator 28 over conductor 62 to the input of vertical sawtooth generator 64, the output of which is connected over conductor 66 to the horizon generator circuit 44.

With reference now to FIGURE 13, the waveform output of the horizon generator 44, shown adjacent conductor 68, occurs for the duration of a raster and is coupled over mixer amplifier 70 and path 36 to circuit 34 (FIG. 3). With the aircraft in level flight, a first blanking portion is provided which extends for approximately one-half the period of the vertical trace, followed by a negative-going portion which results in the trace of the horizon line, and a non-linear positive-going portion which results in a progressively lighter ground texture background for the remainder of the raster trace. With the receipt of signals over pitch input 23, the time of occurrence of the negative-going portion of the illustrated waveform is correspondingly adjusted to occur at different times in the raster trace, and the horizon line will accordingly be moved upwardly or downwardly from the display center in accordance with the relative change in timing of such portion of the waveform.

Digressing briefly, the waveforms shown in FIGURE 13 adjacent conductors 68, 76 and other places in the following description include the letters ST (see FIG. 13) to identify the relative time of the start of the raster trace, the letter H' to indicate the time of occurrence of the horizon line pulse, and the letters ET to indicate the relative time of the end of the raster trace, the exemplary waveforms shown being illustrative of the signals which are provided with the aircraft in level flight.

Vertical sawtooth generator 74

As was further indicated above, the horizon generator 44 is also connected to provide an output signal comprising a positive pulse over conductor 72 to the vertical sawtooth generator 74. Thus in a circuit such as shown in the above identified Reissue Patent 25,756 (FIG. 17) the conductor 72 would be connected to the plate 401 of the first seciton of tube 400 in the horizon line generator circuit 138. It will be apparent that the positive pulse output thereover will occur simultaneously with the negative-going portion of the waveform indicated adjacent conductor 68 which determines the time of generation of the horizon line. The starting pulse provided over path 72 to the vertical sawtooth generator 74 will vary in time during the vertical trace with the inputs to the horizon generator 44 which in turn vary with the pitch of the aircraft.

The vertical sawtooth generator 74 may be of a conventional structure which is capable of providing a positive-going sawtooth and a negative-going sawtooth over conductors 76, 78, respectively (see for example, the vertical sawtooth generator 274 in my Reissue Patent 25,756—FIGURE 6). The start of each set of sawtooth waveforms output from generator 74 is triggered by the input pulse received over conductor 72.

The negative-going sawtooth output of the vertical sawtooth generator 74 is extended over conductor 78 and conductor 186 to the sawtooth differentiating circuit 184 and the speed waveform generator circuitry, as will be described in more detail hereinafter, and also to one input of sawtooth bias circuit 80. The positive-going waveform is extended over conductor 76 to a second input on sawtooth bias circuit 80.

Sawtooth bias circuit 80

The sawtooth bias circuit 80 is basically operative to mix a D.C. bias voltage with the sawtooth waveforms prior to transmission to azimuth pot 86 to thereby provide lateral spacing to the ground texture elements. As shown in FIGURE 13, the negative-going sawtooth waveform on conductor 78 is coupled over voltage divider 292, 294 and capacitor 296 to the input of a PNP transistor 298 which is connected in the manner of an emitter-follower. A bias mixing circuit comprising divider 300, 302 and resistor 304 are connected to provide a bias of approximately −6 volts over resistor 300 for mixing with the negative-going sawtooth which is coupled over capacitor 296 to the base of transistor 298. The resultant output signal (a negative-going sawtooth waveform biassed by a −6 volt signal) is extended over conductor 84 to one end terminal on azimuth pot 96. As will be shown, mixing of the −6 volt bias voltage provides the spacing between the vertical rows of ground texture elements which are generated by the circuitry. The positive-going sawtooth waveform output from vertical sawtooth generator 74 is extended over conductor 76 to a second input for the sawtooth bias adder circuit 80. As shown, the input circuit includes coupling capacitor 268 connected to the base element of a PNP transistor 272 which is also connected in the manner of a conventional emitter follower, the output thereof being connected to a second NPN transistor 276 which is also connected as an emitter follower. The two complementary transistors 272, 276 connected as emitter-followers provide additional power to drive clipping circuitry connected to conductor 128. As shown, the emitter of transistor 272 is connected over resistor 274 to +12 volts potential, the base is connected over resistor 270 to ground and the collector is connected to −12 volts. The collector of transistor 276 is connected to +12 volts, the base is connected to the emitter of transistor 272, and the emitter is connected over resistor 278 to −12 volts.

The output of the series-connected transistors 272, 276 is extended from the emitter of transistor 276 over conductor 128 to mixers 365, 370 and clipper circuits 122, 126 and also over a bias adder circuit which includes a third transistor 290 comprising an NPN transistor connected as an emitter follower, and over conductor 82.

The base of transistor 290 is biassed by positive 6 volts obtained over resistor 284 and voltage divider 286, 288 which is connected between +12 volts and ground potential. The collector of transistors 290 is connected to +12 volts and the emitter is connected through output conductor 82 to the second end terminal of azimuth pot 86.

As was noted above, the purpose of the sawtooth bias circuit is to mix a 6 volt potential with the negative and positive going sawtooth waves. Assuming that the signal output of the vertical sawtooth generator 74 comprised five-volt sawtooths, the outputs which appear on conductors 82, 84 now comprise a sawtooth waveform of five volts plus a D.C. bias voltage of six volts, which waveforms are initiated in each raster trace as the horizon line is drawn on the display.

*Azimuth pot 86*

As will now be shown with reference to FIG. 1, an azimuth pot 86 is operative to provide six discrete signal sets over six outputs leads 96–106 which are used to generate waveforms which result in the display of ground texture elements 16 (FIG. 1).

More specifically, the sawtooth waveforms on conductors 82, 84 (FIGS. 13, 14) are connected via circular conductors 311, 312 (insulated from each other) and terminal wipers 306, 308 respectively to the terminating ends of circular resistance member 310. The resistance member 310 is mounted with the conductors 311, 312 on a support member (not shown) which is rotated by associated mechanical coupling means 94 and the azimuth motor 92 in both a clockwise and counterclockwise direction as will be described. Six fixed wipers A1–A6 located at increments of sixty degrees about the periphery of the rotating resistance wire 310 are operative to pick off voltages, the value of which is determined by the position of the resistance wire 310 relative to the wipers A1–A6.

The nature of the waveforms that are picked off by the wipers A1–A6 with the circular resistance 310 in the position shown, are indicated by the corresponding waveforms adjacent to the pot 86. Manifestly, if the resistance member is rotated in a clockwise direction from the illustrated position, the signal output on wiper A3 for example will be a negative-going sawtooth which becomes increasingly larger until terminating end 308 is adjacent wiper A3. The manner in which the signals change on the other wipers in such movement (or a counterclockwise movement) will be apparent therefrom. The output of the wipers A1–A6 is connected over associated conductors 96–106 to the inputs of the six triangle generators 108–118.

*Triangle generators*

Each triangle generator provides a pulse output which determines the shape and position of a different row of ground texture elements on the display. Thus, each generator produces a triangle pulse at a different interval in each horizontal line trace of the raster, the time of generation of the pulse by a generator determining the lateral location of its associated row of elements. As will be shown, movement of the wipers to change the signal input from the azimuth pot 86 to the triangle generators 108–118 changes the time during the line trace at which each triangle generator operates, and thereby effects lateral displacement of the texture elements across the display in the relative spaced relation determined by the setting of the wipers A1–A6.

In accordance with a novel concept of the invention, the triangle generators used in different parts of the circuitry are similar in structure, whereby the cost of the system may be significantly reduced.

As shown in FIGURE 14, each triangle generator, such as 108, includes a first input circuit which is connected over conductor 132 to a sawtooth generator 134 which provides a negative-going sawtooth waveform during each horizontal line trace of the raster, it being apparent that the sawtooth generator 134 is controlled to operate by the horizontal sync output pulses coupled over path 61 to the generator 134 by the timing generator 28 (FIG. 3). The letters SL on the wave shape shown adjacent conductor 132 (FIG. 3) indicate that the leading edge of the sawtooth occurs with the start of each horizontal line trace, and the letters EL indicate that the sawtooth is terminated at the end of the line trace.

Each of the triangle generator circuits 108–118 (FIG. 14) include a second input circuit, different ones of which are connected to a different wiper A1–A6, whereby each of the triangle generators receives an input signal of a correspondingly different value from the azimuth pot 86. Thus, each of the triangle generators 108–118 operates once in each line trace, the time of operation during a line trace being determined by the value of the particular signal which is received from its associated wiper A1–A6 on the pot 86. The triangular shaped waveform output of each triangle generator, such as 108, is extended over an associated conductor, such as 340, and an associated diode 342. As will be shown, the output circuits for the first, third and sixth triangle generator 108, 112, 116 is connected to conductor 356 and the output of the second, fourth, and sixth generators 110, 114 and 118 is connected to conductor 373. The specific structure of the triangle generators is now set forth in detail by reference to triangle generator 108.

The common input conductor 132 over which the negative sawtooth wave is received during each line trace of the raster is connected in each triangle generator to an input circuit, including a resistor 312 which is connected to the base of a first transistor 314. Transistor 314 is an NPN transistor included in the group of three transistors 314, 322, 324 connected in a differential amplifier configuration. Transistor 314 has a collector connected over resistor 316 to +12 volts, an emitter connected over resistor 318 to the collector of transistor 324.

The second transistor 322 is an NPN transistor including a collector element connected over resistor 324 to +12 volts, the base is connected to the wiper A1 of the azimuth pot 86, and the emitter is connected over resistor 320 in a common connection with transistor 314 to the collector of transistor 324.

Transistor 324 which is an NPN transistor connected as a constant current device for transistors 314, 322 includes an emitter element connected over resistor 326 to a negative 12 volt potential, a base connected over conductor 345 to a constant voltage bias circuit 346, and a collector connected over resistors 318, 320 to the emitters of the transistor 314, 322.

A pair of diodes 328, 330 connect the collector outputs of transistors 314, 322 respectively to the input of the transistor 332, which is connected to operate as an inverter for the triangular shaped output signals provided by the transistors 314, 322 and diodes 328, 330. Transistor 332 is a PNP transistor having an emitter connected over resistor 336 to +12 volts, a base connected to diodes 328, 330, and also over resistor 334 to ground, and a collector connected over resistor 338 to ground, and also to the output conductor 340 and diode 342.

As indicated above, the purpose of each triangle generator, such as 108, is to generate a triangular shaped waveform output during each horizontal line trace of the raster, the different triangle generators being controlled to operate at different times in the line trace. The time of generation of the triangular wave shape by a generator, such as 108, is determined by the amplitude and polarity of the sawtooth signal input by the azimuth pot 86 over the associated conductor, such as 96, (I2) to the base of the second transistor 322 in the differential amplifier.

More specifically, at the start of each line trace in the raster, the negative-going horizontal sawtooth is provided by generator 134 over conductor 132 to the base of the first transistor, such as 314, in each of the triangle generators 108–118. If the voltage at the base of transistor 314 is more positive than the voltage at the base of transistor 322 (which is determined by the setting of its associated wiper A1 on pot 86) transistor 314 will conduct and current flows from positive 12 volt potential over resistor 316, transistor 314, resistor 318, transistor 324 and resistor 326 to negative 12 volts. As a result thereof, the voltage at the collector will be at its most negative value as shown by portion A of the curve shown adjacent the output of transistor 314. As the negative sawtooth provided over conductor 132 decreases in value, the transistor 314 continues to conduct until such time as the voltage at the base of transistor 314 is approximately equal to the voltage at the base of transistor 322. At such time, transistor 314 begins to turn off gradually and transistor 322 begins to turn on, and the portion of the curve identified by the letter B is generated and coupled over diodes 328, 330 to transistor 332. At such time as the transistor 314 is finally fully cut off, point C of the waveform will be reached. Transistor 322 will be fully conductive at such time, and as will be apparent from the signal waveform which is shown adjacent the output of transistor 322, a complementary waveform is provided by transistor 322.

With the coupling of the resultant signals over diodes 328, 330, the wave shape shown at the base of transistor 332 is coupled to transistor 332. Corresponding time periods in the two input pulses A, B, C, to diodes 328, 330 and the output pulse from the diodes 328, 330 are identified by the letters A, B, C.

The transistor 332 provides an inverted triangular shaped waveform over conductor 340 as shown by the waveform in FIGURE 14. The triangular shaped waveform output thus provided by the triangle generators 108–118 are not changed in size or shape. The only change in the generation of the triangles by the successive generators 108–118 is in the time of occurrence in relationship to the starting time of each horizontal line trace. As indicated, such variation in time of occurrence during a line trace is effected by the signal received from azimuth pot 86 over conductors 96–106 to the different generators.

With reference to FIGURE 5, the paths there shown (which in the system are broken up into ground texture elements) are exemplary of the display which would be achieved with the pot 86 in the illustrated position. Briefly with the pot thus positioned wiper A1 provides a large negative voltage to triangle generator 108 which therefore operates first in the horizontal line trace. Additionally the slope of the sawtooth results in a corresponding slope of the paths, as shown in FIGURE 5 and the D.C. bias provides the lateral position. The second wiper A2 has a negative-going waveform of a smaller amplitude, so that the path 2 occurs at a later interval in each line scan. Since the slope of the waveform is less, the path 2 has less skew. Wiper A3 being in midposition occurs at the center of the trace. Since the two sawtooths cancel out at the center of the pot, there will be no sawtooth waveform on wiper A3, and the path will not be skewed. The output of wiper A4 is a small amplitude positive-going wave and the path 4 therefore occurs after the center of the display, and the skew is to the right. Wiper A5 provides a larger positive-going signal and a path at yet a later time in the trace with increased skew to the right. Wiper A6 is without signal, and accordingly does not provide a path at this time. The manner in which the paths are moved laterally in either direction will be disclosed in more detail hereinafter.

The bias circuit 346 (FIGURE 14) provides a compensated voltage to the bases of the constant current transistors, such as 324, in each of the triangle generators 108–118, and, as shown, basically comprises a voltage divider including resistance 348, diodes 350, 352, and resistor 354 connected between −12 volts and ground, the diodes being operative in such connection to provide a voltage output over conductor 345. The diodes in the circuit compensate for any variations which might occur as a result of temperature changes of the triangle generators.

The outputs of the first, third and fifth generators 108, 112, 116 are connected over conductor 356 to a transistor 358 which is connected in the manner of an emitter follower. The output circuit of the transistor 358 is connected between the emitter and one input of a mixing circuit 365 including resistors 364, 366 and 368. The triangular waveforms provided by the three generators 108, 112 and 116 are thus coupled over the emitter follower 358 and resistor 364 to output conductor 120. Additionally, the positive sawtooth signal provided by the sawtooth circuit 74 over conductor 128 (it being recalled that such sawtooth is initiated during each raster at the time of the trace of the horizon line on the display) and is provided over emitter-followers 272, 276, and conductor 128 (FIG. 13), and perspective-width resistor 370 (FIG. 14) and the second resistor 366 in the mixing circuit to the output conductor 120. Additionally, the mixing circuit includes a third resistor 368 for connecting a −12 volt bias to output conductor 120.

In a similar manner, three triangular shaped signals provided in each horizontal line trace by the even numbered triangle generators 110, 114 and 118 are connected to conductor 373 and over transistor 374 connected as an emitter follower to mixing resistor 376 in the mixing circuit 370 which includes resistors 376, 378 and 380 connected in the manner of resistors 364, 366, 368 respectively. The output of mixing circuit 370 is connected to conductor 124.

Briefly summarized, the three triangular shaped signals provided over conductor 356 during each horizontal line trace of the raster illustrated by the waveforms O adjacent to such conductor, and the set of three triangular wave shaped signals provided over conductor 373 are illustrated by the waveform E. The pulses as extended over the mixing circuits 365, 370 are mixed with the −12 v. bias potential, and the vertical sawtooth waveform (which is initiated as the horizon line is traced) and extended over odd and even conductors 120 and 124, as indicated by the waveshapes O' and E' adjacent thereto, to the inputs for the odd clipper circuit 122 and the even clipper circuit 126 respectively (FIG. 16). The odd clipper circuit 122 and even clipper circuit 126 are of the same construction and accordingly only one circuit 122 is shown and described in detail hereat.

*Clipper Circuits 122, 126*

As shown in FIGURE 16 the odd clipper circuit 122 basically comprises a first transistor 384, connected as an amplifier, including an emitter element connected over diode 388 to ground, and over resistor 390 to −12 volts; a base element connected to the odd conductor 120, and a collector connected over resistor 306 to +4 volts. At such time as the algebraic sum of the triangular shaped wave as superimposed on the sawtooth waveform, exceeds the voltage on the emitter of transistor 384, transistor 384 conducts to saturation, whereby the triangular shaped input signal is amplified to a substantially square wave signal as shown by the waveforms adjacent the collector of transistor 384.

The output of transistor 384 is coupled to the input of transistor 392, and further amplified to decrease the rise and fall time of the leading and trailing edges of the input waveform, to thereby provide three substantially square shaped waveforms over output conductor 186 in each horizontal line trace of the raster to the mixer and amplifier circuit 70. As will be shown, whenever gate 123 is enabled by a signal received over conductor 140 from the speed control circuitry, the wave shapes will not be extended over conductor 186 to the mixer and amplifier circuit 70.

In a similar manner, the even clipper circuit 126 effects the provision of a square wave output for the three triangular wave shaped impulses which are received over input conductor 124 during each horizontal line trace, the output being extended over conductor 188 to a second input on mixer and amplifier circuit 70. Gate 127 associated with clipper circuit 126 is likewise controlled by signals received over conductor 142 from the speed control circuitry, the gate 127 being operative as turned on to prevent the extension of signals over conductor 188 to the mixer and amplifier circuit 70.

The signals applied to conductors 186, 188 by the clipper circuits 122, 126 are extended over diodes 402 and 400 to the input of transistor 404 which is connected as an emitter follower, and thence over coupling capacitor 406 and transistor 408, which is connected as an amplifier to resistor 410 and diode 412 and input conductor 36 to video amplifier 37. The output of video amplifier 37 is connected to the gun of the cathode ray tube 34 (FIG. 3).

A sky blanking circuit 414 is controlled by a signal over conductor 68 from the horizon generator circuit 44 to blank the extension of the signal output of clipper circuits 122, 126 over coupling capacitor 406 during the period that the sky portion of the trace is being effected on the raster. As shown, such circuitry basically comprises an input circuit including resistors 416, 418 which couple the blanking signal to transistor 420. During the period of a blanking signal transistor 420 is turned on to shunt to ground the signal output from the clipper circuits 122, 126 and emitter follower 404.

In brief summary, during the portion of the sky trace, that is, prior to the provision of the leading edge H' of the horizon line pulse signal over conductor 68 to the blanking circuit 414, the transistor 420 is conductive to shunt the output signals of the clipper circuits 122, 126 and emitter follower 404 to ground. As a result, even though the clippers may provide an output, the signals will not be coupled to the display unit. As the horizon line generator 44 produces the negative going portion H' of the horizon line pulse the horizon line is traced, and the signal is removed from conductor 68 allowing the signal output of the clippers 122, 126 to be transmitted over mixer-amplifier circuit 70 to the gun of the cathode ray tube.

At such time as the combined value of a triangular shaped pulse from an even numbered generator and the vertical sawtooth pulse exceeds the bias value of the input transistors, such as 384, in the clipper circuit 122, a square wave is coupled to the gun of the cathode ray tube. As the raster trace continues, and the value of the vertical sawtooth increases during successive line traces of the raster, the portion of the triangular shaped waveform which is passed by transistor 384 increases, and accordingly the width of the square waves increases. As a result, the width of the path used to generate the texture elements will increase as the raster trace progresses. As noted above, absent the provision of further input signals, the paths shown in FIGURE 5 would be traced on the display by the output signals from clipper circuits 122, 126.

The skew of the paths is, of course, the result of the wave shape and bias of the resultant signal obtained by the wipers, and fed to the individual triangle generators 108-113. As the azimuth motor 92 turns the potentiometer, the values picked up by the successive wipers will change in a corresponding manner, and the location of the particular path which is provided by its associated triangle generator will be displaced on the display by a corresponding amount.

*Azimuth drive*

As indicated hereinbefore in the description of FIGURE 3, azimuth motor 92 is caused to rotate in either direction as bank indication signals are coupled over path 21 by the attitude gyro to the generator 88 and motor 92. Moreover in the achievement of a real world presentation according to a novel concept of the invention, the equipment 88, 92, 86 is operative to provide an indication of the rate of turn of the aircraft and the paths are displaced laterally across the screen at such rate.

In aircraft which is equipped with a compass in which it is possible to derive signals indicating the rate of turn as the aircraft is maneuvered through a bank or turn, such signals are fed directly to the motor 92, and the desired rate of turn indication is automatically provided by motor 92 in its movement of the azimuth pot 86.

In aircraft which are not so equipped, the D.C. potential signal which is derived from an attitude gyro 19 is converted by rate generator 88 into a rate of turn signal for use in controlling the motor 92 and potentiometer 86 to move the paths laterally across the screen at a rate related to the degree of bank or turn being effected.

Figure 15:

With reference to FIGURE 15, the azimuth rate generator circuit 88 is basically controlled by signals received over a first input circuit 21 which, in one commercial unit, comprises a D.C. voltage which ranges between +1 volt and −1 volt in accordance with the degree of bank of the aircraft. When the aircraft is not banking, a zero potential is placed on input conductor 21.

A second input circuit 77 is connected to azimuth rate generator 88, such connection being connected over path 76 to vertical sawtooth generator 74. It will be recalled that generator 74 initiates a positive going sawtooth at the same time that the horizon line is generated in the raster.

The signals received over the roll input path 21 are extended over resistor 426 to a pair of oppositely poled diodes 432, 434. The vertical sawtooth input on conductor 76 is extended over coupling capacitor 428 and resistor 430 to the input of the two diodes 432, 434. The purpose of the diodes is to prevent a signal output within a certain input range which may be, for example, in the order of plus or minus one-half volt, so that there will be no indication on the display in response to minor aircraft deviation in roll. The combined D.C. and sawtooth signals are fed to the input of a differential amplifier circuit 435 which includes a first transistor 436 and a second transistor 440 connected in the manner of a differential amplifier. The emitters of transistors 436, 440 are connected common over a third transistor 448 which operates in the manner of a constant current source therefor.

Briefly, transistor 448 comprises a PNP transistor including an emitter connected over resistor 454 to +12 volts, a base connected over voltage divider including resistor 450, 452 connected between +12 volts and ground, and a collector connected common to the emitters of the differential amplifier transistors 436, 440. Transistor 436 is a PNP transistor including a base connected over resistor 438 to ground and the collector is connected over resistor 444 to −12 volts and over coductor 476 to one input of divider circuit 474. Transistor 440 is a PNP transistor including a base connected over resistor 456 to the adjustable arm of potentiometer 458, which is in turn connected between plus and minus 12 volts, and a collector connected over resistor 442 to −12 volts, and over conductor 477 to the input for driver circuit 460. Capacitor 446 is connected between the collectors of the transistors 436, 440 for filter purposes.

The adjustable potentiometer 458 in use is normally set so that with zero input on the roll input path 21, the width of the pulses (1), (2) provided by the differential amplifier 435 over conductors 476, 477 will be equal. That is, as indicated by the waveforms adjacent conductors 476, 477, the transistors 436, 440 are controlled by the D.C. input on path 21 and the sawtooth input on path 76 to generate pulses which are out of phase, and which with zero signal output over diodes 432, 434 are of equal width.

As shown in the example identified by letter A immediately below the waveforms shown on conductors 476, 477, if the input signal received over input path 21 goes more negative, the pulse on conductor 477 increases in width and the pulse on conductor 476 decreases in width. In like manner, if the input signal on path 21 were to go more positive, the pulse on conductor 476 would increase in width, and the pulse on conductor 477 would decrease in width. Stated in another manner, the duty cycle of the pulses output over conductors 476, 477 is varied with the input over path 21.

Driver circuits 460 and 471 are alike and accordingly only one is described in detail. Driver circuit 460 is connected to improve the wave shape of the duty cycle pulse on conductor 477 and includes an input circuit comprising resistor 461 connected to the base element of transistor 462 which is connected as an amplifier to provide pulses which have more vertical leading and trailing edges.

Transistor 462 is an NPN transistor which includes an emitter connected over resistor 468 to negative 12 volt potential, and a collector connected over resistors 464, 466 to plus 12 volt potential. The junction of resistors 464, 466 is connected to the base of transistor 470 which is connected in the manner of an emitter follower, the collector being connected to +12 volt potential and the emitter being connected over resistor 472 to —12 volt. The output of transistor 470 is connected over conductor 480 to a first input on the bridge circuit 485.

In a similar manner, driver circuit 474 improves the waveshape of the variable duty cycle pulses provided by transistor 436 over conductor 476 and the output thereof is connected over a second input circuit 478 of bridge circuit 485.

Bridge circuit 485 basically comprises two pairs of transistors 486, 488 and 496, 498, each of which pairs is operative as turned on to complete a different direction control circuit for the azimuth motor 92, the one pair of transistors 486, 488 effecting operation of the motor in a first direction and the second pair effecting operation of the motor in the opposite direction.

Briefly, transistor 486 includes a collector connected to +6 volts D.C., a base connected over resistor 484 to conductor 480 and an emitter connected to output conductor 500. Transistor 488 includes an emitter connected to ground, a base connected over resistor 482 to conductor 480 and a collector connected to output conductor 502.

In the second set transistor 496 includes an emitter connected to ground, a base connected over resistor 492 to drive conductor 478 and a collector connected to output conductor 500. Transistor 498 includes a collector connected to +6 volts, a base connected over resistor 491 to drive conductor 478 and an emitter connected to conductor 502.

Thus, input circuit 480 provides variable duty cycle pulses from driver 460 and output 477 of differential amplifier 435 to transistor 486 and transistor 488, and input circuit 478 provides variable duty cycle pulses from driver 474 and output 476 of differential amplifier 435.

When the input signals on input conductor 480 are positive, the transistor pair 486 and 488 turn on and +6 volts D.C. is applied over transistor 486 to conductor 500, and ground is connected over transistor 488 to the conductor 502. Since azimuth motor 92 is connected across motor conductors 500, 502 and motor conductor 500 is positive with respect to motor conductor 502, the motor will rotate in a first direction. As the input pulse on input conductor 480 terminates and the pulse appears on input conductor 478, transistor pair 496, 498 is turned on. As a result, transistor 496 connects ground to the conductor 500, and transistor 498 connects +6 volts to conductor 502. In that motor conductor 502 is now positive with respect to motor conductor 500 motor 92 rotates in the opposite direction.

As will be apparent, the out-of-phase pulses on conductors 480 and 478 occur at the rate of the sawtooth signal on conductor 76 which is 62 c.p.s. In the event that the pulses on conductors 480 and 478 are of equal width (zero input on roll input path 21), the motor 92 will be substantially at a standstill. However, as soon as an input signal is received over roll input conductor 21 which is of sufficient value to be transmitted over diodes 432, 434, the duty cycle of the output pulses on conductors 477 and 476 is correspondingly altered. Assuming, for example, that a negative pulse is provided to differential amplifier 435 to provide the duty cycle illustrated by letters A adjacent conductors 476, 477, the pulses on the input circuit 480 will be of a longer duration than the pulses on input circuit 478, and the motor will be displaced further in the first direction than it will in the opposite direction to provide a net increase or advance in the first direction (the direction obtained when conductor 500 is positive with respect to conductor 502). As the azimuth motor 92 rotates in this manner, it is effective over mechanical coupling 94 to advance the azimuth pot 86 in a connecting rotational displacement to thereby provide signals of correspondingly different values to the successive inputs 96–106 for the triangular generators 108–118 (FIG. 3) whereby the generated rows are shifted laterally across the display area of the cathode ray tube 34. Movement of the motor in the opposite direction (conductor 502 positive relative to conductor 500) the rows are shifted laterally in the opposite direction.

*Speed Control Circuitry*

As was described, the output of azimuth pot 86 in effect comprises five (or six) paths as shown in FIGURE 5, the speed control circuitry 145 (FIG. 3) is effective to break up the paths shown in FIGURE 5 into ground texture elements, such as shown in FIGURE 7, by effecting the generation of a series of successive lines of progressively increasing widths (FIG. 6) which are spaced at variable distances from the horizon line and each other. The manner in which the speed control circuitry 145 is so operative is now set forth.

With reference to FIGURE 17, a speed pot 152 similar in construction to the azimuth pot 86 (FIG. 14) is used to provide motion to the ground texture elements as generated. As shown, the speed pot 152 includes a wire resistance 151, the two ends of which include wipers for picking up potential from center rings 154, 156 which have plus and minus D.C. potential connected thereto by wipers 155, 157 respectively. Resistance element 151 is mounted on a support (not shown) which is driven by shaft 150 and speed motor 148, as will be set forth. With rotation of motor 148 and resistance 151, the wipers S1–S6 which are located at equally spaced increments of 60 degrees about the periphery of the resistance member 151, will pick off correspondingly different values of potential for their associated leads 158–168 respectively for coupling to the speed triangle generators 170–180.

Triangle generator circuits 170–180 are identical in structure to the azimuth triangle generators 108–118, including the two input circuits I1, I2 and no further description is believed to be required. Bias circuit 532 is similar to azimuth bias circuit 346 (FIG. 14) and likewise requires no further description.

The second input circuit I1 of each of the speed triangle generators 170–180 is supplied with a nonlinear sawtooth which is received over conductor 182 from the differentiating circuit 184 which is in turn controlled by the output of the negative sawtooth waveform provided by vertical sawtooth generator 74, which is in turn synchronized to the horizon line.

With reference to FIGURE 13, the sawtooth differentiating circuit 184 includes an input circuit 186 which couples the negative sawtooth output of vertical sawtooth generator 74 from conductor 78 over coupling capacitor 252 at the vertical frame rate (62 c.p.s.) to the input for a shaping circuit including a PNP transistor 250 and an NPN transistor 264 which are connected in series. The pair of transistors 250, 264 is utilized to compensate each other for possible drift which may occur in changing temperature environments.

The straight line slope of the input sawtooth as applied to RC circuit 252, 254 is changed to a nonlinear waveform which, as applied to emitter followers 250, 264, is further transmitted in its nonlinear form, over output conductor 182 (FIGS. 14, 16, 17) to the second input I2 of each of the speed triangle generator circuits 170–180.

The speed triangle generator circuits 170–180 are controlled by the vertical sawtooth input over conductor 182 to each of the circuits I1 to provide, in time spaced increments, six triangular shaped pulses for transmission to the clipper circuits 122, 126 (FIG. 3). Since the vertical sawtooth on conductor 182 is initiated with generation of the horizon line in each raster, the time of generation of the first pulse by generators 170–188 will be delayed until such time. Each of the second input circuits I2 of speed triangle generators 170–180 is connected to a correspondingly different wiper S1–S6 on speed pot 152 (FIG. 17). As will be shown, the width of the triangle pulses generated by generators 170–180 will vary as a result of the nonlinear shape of the input sawtooth on conductor 182, and the spacing between the generation of the successive triangular waveshapes is determined by the voltages on the wipers S1–S6, and the rate of change of the input sawtooth. Further, as a wiper, such as S1 for example, provides a voltage over conductor 158 to associated generator 170 at any given time, rotation of the pot to move the resistor 151 relative to wiper S1 results in a different value put on conductor 158 and the occurrence of the line provided thereby at a correspondingly later time in the trace. By changing the position of trace in successive rasters, the line (if drawn) moves across the screen from the horizon to the lower marginal edge.

Thus, by way of example, it is assumed that with the speed pot 152 in the position shown a signal in the order of +3 volts is impressed by wiper S1 over conductor 158 to input circuit I2 of the first triangle generator 170, and the nonlinear sawtooth is initiated on conductor 182 and transmitted over input path I1 to triangle generator 170. As the voltage of the sawtooth input on circuit I1 decreases to the voltage on input I2 obtained from the speed pot 152, the differential amplifier in the triangle generator 170 operates in the manner described above to provide a triangular waveshape output over mixing diode 516 and conductor 528 to the amplifier circuit 534.

As the raster progresses, the value of the sawtooth waveform on conductor 182 decreases further, and as the waveform approaches the value of the signal applied over the input circuit I1 by wiper S2 to second triangle generator 172 a triangular wave shape is generated and transmitted over diode 518 to the even conductor 530 and amplifier circuit 536 (the time period of generation of such triangle on the raster is represented by b, FIGURE 6). Triangle generators operate in such manner with the outputs of the first, third and fifth generators being coupled over conductor 528 to amplifier 534 and the outputs of the second, fourth and sixth generators are coupled over conductor 530 to amplifier 536. As will be shown, as the speed motor 148 rotates in a counterclockwise direction, the signal on wiper S1 is more negative, and line a is drawn at a later time in the raster. Thus, in successive traces, line a moves down the trace toward the bottom edge of the display.

As shown in FIGURE 17, the amplifier 534, which receives the output signals of the first, third and fifth triangle generators 170, 174, 178 over a conductor 528, includes an input circuit connected over a voltage divider including resistances 538, 540 to the base of transistor 542. The base of transistor 542 is further connected over resistor 544, to −12 volt potential.

The pulses received over conductor 528 are amplified by amplifier circuit 534 and extended over resistor 548 and conductor 142 to gating circuit 127 (FIGURE 16). Feedback capacitor 547 slows down the rise and fall time of the output waveform extended over conductor 142. During such period a negative waveform is transmitted over conductor 142, gate 127 comprising a transistor 550 is turned off to allow the output of the even clipper circuit 126 to pass, thereby passing the output signals provided by the even clipper circuit 126 over conductor 188 to the mixer amplifier 70.

In a similar manner, the output pulses provided by the second, fourth and sixth triangle generators 172, 176, 180 are extended over amplifier 536 and conductor 140 to gate 123 (FIG. 16), and during such period as the three odd negative pulses are transmitted over conductor 140 in each raster, gate 123 is enabled to pass the signal output of odd clipper circuit 122 to thereby allow the transmission thereof over conductor 186 to the mixer amplifier circuit 70.

With reference to FIGURE 6, the period that the gates 123 and 127 are enabled by the first, second and third pulses, for example, is indicated by the lines a, b, c. More specifically, during the period the first, third and fifth triangle wave shapes are applied over conductor 528 (FIG. 17) to the amplifier 534, transistor 542 turns on and the resultant negative signal over conductor 142 turns off the gate circuit 127. In a similar manner, when the second, fourth and sixth triangle pulses appear on conductor 530, amplifier circuit 536 is turned on, and the negative pulses turn off gate 123.

With reference to FIGURE 7, during the period that the second speed triangle generator 172 (FIGURE 17) generates the second triangular shaped pulse b in the raster which pulse is applied over diode 518 to the amplifier 536 to turn amplifier circuit 536 on and gate 123 off, any portion of the even rows generated by the azimuth circuitry during the period b will be conducted to mixer amplifier circuit 70, and will result in the display of the ground texture elements shown in FIGURE 7.

With reference to odd clipper circuit 122 (FIG. 16) for example, when the odd clipper circuit 122 is energized by the third azimuth pulse during each horizontal line trace (as best indicated in FIGURE 5) the signal as input over conductor 120 is amplified by transistors 384 and 392 and extended over gate 123 to ground. If there is no speed pulse, the signal is gated to ground (see dotted line n for example). However, as the third speed pulse occurs in the time period c of the raster, gate 123 is turned off, and the pulse signal output of clipper 122 is extended over conductor 186 and diode 402 to transistor 404 which is connected as an emitter follower. The signal output of transistor 404 is coupled over capacitor 406 to transistor 408 which is connected as an amplifier. The amplified negative going pulse is coupled over resistor 410 and diode 36 to video amplifier 37 and the grid of the gun in the cathode ray tube 34 to provide a dark line for the coincident periods of the pulse provided by the third speed generator and the pulses provided by the third azimuth generator to thereby generate ground texture element 3c (FIG. 7). The manner in which the other ground texture elements are generated will be apparent therefrom.

In effecting movement of the ground texture elements along the paths so as to cause the elements which emanate from the horizon to move downwardly towards the bottom marginal edge of the display, the speed pot 152 (FIG. 17) is rotated so that different value potentials are continually sensed by the wipers S1–S6 and supplied to the triangle generators 170–180.

The speed sensor circuit 24 may basically comprise means for providing D.C. signals over conductor 25 to the input of a transistor 508 connected as an emitter follower. Such signals may, for example, be arranged to vary with the changing position of the throttle. Alternatively, the aircraft air speed sensor may be connected to provide a D.C. potential input over conductor 25 which varies with the air speed.

The output of transistor 508 is connected over path 146 to the speed motor 148 which rotates at a speed whenever the aircraft is in flight at a rate related to the value of the received signal. Motor 148 through mechanical linkage 150 drives the resistance element 151 of pot 152 in a rotational displacement to vary the signal output over the wipers S1–S6. Capacitor 512 and diode 514 are connected to protect the transistor from possible transient outputs of the speed motor 148 and the emitting of RF noise.

Manifestly, as the wipers receive changing voltages, the positions and the width of the horizontal lines *a, b, c,* such as shown in FIGURE 6, are also changed in successive raster presentations. With reference to FIGURE 6, assuming the first pulse is provided on speed triangle generator 170 and occurs for the time period *a* shown with the pot rotates counterclockwise, a more negative signal is applied to the wiper S1 and speed generator 170 will provide an output pulse at a later time in the raster. As such action occurs in successive raster traces, the time period *a* defined by the pulse output of the first generator 170 gradually moves toward the bottom of the display. As the start of resistance element 151 moves into contact with wiper S6, a line is generated almost simultaneously with the generation of the horizon line, and such line also moves downwardly on the screen with cotninuous rotation of the wire 151.

As the pulses provided by a generator occur at successively later times in the raster, a different portion of the sawtooth input over conductor 182 to the generator is effective, and accordingly the width of the pulse generated increases as its time of occurrence in a raster increases (see for example pulses *a, b, c,* in FIGURE 6) whereby the pulses grow in size along the vertical dimension in their advance toward the bottom marginal edge of the screen. The changing width of the elements as achieved by the nonlinear sawtooth input to the azimuth generator 108–118 is described above.

*Flight Path Generation Circuitry*

As indicated above, the flight path of the present disclosure is basically effected by providing a sawtooth waveform at the vertical rate of the raster, and mixing the sawtooth with triangular shaped waveforms which are generated at the rate of trace of the raster horizontal lines. The vertical sawtooth is delayed from the start of the raster by a delay circuit, thereby causing the path to move vertically with either a pitch signal or a command altitude change.

As shown in FIGURE 10, at the start of the path the combined amplitude of the waves is sufficient to exceed such bias, and a small portion of the triangle is conducted by the clipper circuit. The width of the base of the triangle portion which was thus passed is very small, and only a very brief trace occurs during such line. As the raster trace proceeds, the portion of the triangular shaped waveform passed by the clipper circuit increases so that the portion of the horizontal line during which the combined signals are effective is likewise increased. As a result, a path having a wedge shaped outline is generated as shown in FIGURE 10.

The circuitry for effecting the generation of the path is shown in detail in FIGURES 18–20. As there shown, a negative vertical sawtooth signal which is obtained from vertical sawtooth generator 64 (FIGURE 3) is used in the generation of the path, and is coupled over conductor 65 to the path vertical delay circuit 204. As will be shown, variable signals for varying the path vertical position including glide slope input signals when the unit is used with ILS equipment, or altitude hold signals when a constant altitude is to be maintained, or changing pitch signals may be fed into the path vertical circuit 204 over paths 560, 561, 238 (FIG. 18) respectively to control the vertical postion of the path on the screen.

Referring now to FIGURE 4, the resultant signal output of the path vertical delay circuit 204 is fed to the path sawtooth circuit 208 which generates a sawtooth waveform with characteristics adjusted to the signal input from the delay circuit 204. The sawtooth waveform is mixed with the output of path triangle generator 212 in mixer circuit 217. The path triangle generator 212 is in turn controlled by horizontal sawtooth input thereto over path 135 which occur at the frequency of the horizontal line trace of the raster.

The mixed signal output of mixer 217 is coupled over conductor 220 to the first clipper circuit 222 at which point clipping occurs, and the resultant signals are gated by gate 223, as will be shown. The resultant signal is then sent over conductor 230' to the mixer and blanking circuit 245 for coupling to the gun of the cathode ray tube over conductor 230. A V-shaped path, such as shown in FIGURES 1 and 2, is produced by such signals.

As was noted above, the output of mixer circuit 217 is also fed over conductor 224 to a second clipper circuit 226 for the purpose of generating a second path which, if displayed, would occur inside the first path. However, instead the second path output from the clipper circuit 226 is fed over conductor 228 to the input of the gate circuit 223 which is responsive during the period of an output from clipper circuit 226 to block the output of the first clipper circuit 222 to path 230' to mixer and blanking above the apex and to display tube 34. The flight path circuitry and its manner of operation are now described in more detail.

SPECIFIC DESCRIPTION OF FLIGHT PATH CIRCUITRY

With reference now to FIGURE 18 the path vertical delay circuit 204 includes a negative vertical sawtooth waveform which is received over conductor 65 from the vertical sawtooth generator 64 (FIGURE 3) at the vertical rate of the raster. Additionally, switch 565 is adjustable to provide glide slope signals from path 560 or altitude hold signals from path 561 over the input path 566. Glide slope signals may, of course, be provided by any of a number of well known commercial receiver equipped with ILS, such as Narco Mark 12 unit, and the altitude hold signal, may be obtained from well known device of such type such as a Mitchel Model No. 52D18. The signals in both instances are variable D.C. signals which in one case indicate deviation from a pre-established glide slope and in the other case indicates deviation from a preselected attitude. Additionally, signals indicating variation in pitch are provided over input circuit 238 by pitch control amplifier 236 which in turn receives input information over input path 234 from pitch sensor 22 (FIG. 3) of the type commercially available for conventional aircraft use.

The path vertical delay circuit 204 basically comprises a differential amplifier 562 including a first transistor 576 and a second transistor 580 having their emitters connected common to the output of a transistor 584 connected as a constant current device. The constant current device 584 includes an emitter connected over resistor 586 to −12 volts and a base element connected to the bias circuit 602 which, as will be shown, supplies the bias voltage for a number of the constant current devices in the flight path circuitry. The collector of transistor 584 is connected common to the emitters of the first two transistors 576, 580.

The collector of the first transistor 576 in the differential amplifier 562 is connected over resistor 578 to +12 volts, and also over resistor 583 to the input for amplifier 590 which is connected as an amplifier. The base of transistor 576 is connected to conductor 65 over which a vertical sawtooth signal is coupled at the rate of the vertical trace. The base of the second transistor 580 is connected over capacitor 588 to ground, and over resistor 567 and path 566 to switch 565 which is adjustable to select D.C. signals from the glide slope or altitude hold circuitry. The base is further connected over resistor 564 to the output of pitch amplifier circuit 236. A voltage divider 568, 570, 574 is connected over resistor 572 to the input circuit path 566. The collector of transistor 580 is connected over resistor 582 to ∓12 volts potential.

Transistor 590 which is connected as an amplifier for the output signals of the differential amplifier 562 includes an emitter connected to +12 volts, a base connected over resistor 583 to the collector output of the first transistor 576, and a collector connected over resistor 592 to ground. The collector output of amplifier 590 is connected over resistor 594 to transistor 600 which is also connected as an amplifier. The output of transistor amplifier 600 is connected over conductor 206 to the input for the path sawtooth circuit 208.

Digressing briefly, the bias circuit 602 which provides the biasing potential for a number of different constant current devices, such as transistor 584 in the path vertical delay circuit 204, basically comprises a resistor 604 connected between the bias circuit output and ground, and a first and second diode 606, 608 and resistor 610 series connected between the output circuit and −12 volts. The output circuit for the bias circuit 602 is also connected over capacitor 612 to ground. Such circuit maintains a stable constant current through transistor 584 even in use in severe temperature environments.

In operation, with the coupling of the negative sawtooth signals to the input of transistor 576 in differential amplifier 562 at the vertical rate of the raster (and assuming a zero voltage input over input 569 from the pitch amplifier 236, and glide slope and altitude hold inputs to the base of the second transitsor 580) the differential amplifier 562 is operative to produce a pulse output to amplifier 590 the leading edge of which, with the assumed conditions, occurs approximately midway in the vertical trace. That is, at such time as the amplitude of the input sawtooth on conductor 65 to differential amplifier 562 decreases to a value at the base of the first transistor 576 which is approximately equal to the value of the voltage on the base of the second transistor 580, the leading edge of the square wave pulse shown adjacent transistor 576 is generated. The values of the circuitry are so set that with the aircraft in level flight, the generation of the square wave will be initiated at approximately midpoint of the raster trace, as also shown in the waveforms adjacent the collector output of transistor 576. As further indicated, by directional arrows on the leading edge of such pulse, variations in the input signals over input circuit 569 as a result of changes in pitch of the aircraft, or a result in deviation of the aircraft from the desired glide slope or altitude hold conditions, the leading edge of the pulse will be moved left or right by a corresponding amount (i.e., will occur earlier or later in the vertical trace of the raster).

The output signals of differential amplifier 562 are amplified by transistor 590 and inverted, and as extended over transistor 600 are further amplified and re-inverted to the shape indicated by the waveform adjacent the output of transistor 600.

The pulse output of the path vertical delay circuit 204 is coupled over path 206 to a differentiating circuit including capacitor 612 and resistor 614 and diode 616, and the leading edge of the square wave is differentiated to provide a sharp pulse, such as shown adjacent capacitor 612. Such signal is used for the purpose of initiating generation of a sawtooth waveform by the path sawtooth circuit 208.

The path sawtooth circuit 208 which is thus triggered at different times during the raster trace in accordance with the input signals received from the pitch, glide slope, or altitude hold circuits basically comprises a first transistor 618 connected as a switch to control a discharge path for capacitor 637, and a second transistor 620 which controls a charging path for capacitor 637. The charging circuit extends from +12 volts over resistor 622, transistor 620, and capacitor 637 to ground. The rate of flow of current over such circuit is controlled by transistor 620 which is in turn controlled by the circuit including resistor 624, diode 626, resistor 628 and adjustable resistor 630 which are connected between +12 volts and ground, the base of transistor 620 being connected between the junction of the diode 626 and resistor 628. The diode 626 is a temperature compensating diode.

The transistor 618 which controls the discharge circuit for capacitor 637 is in turn enabled by the triggering pulse received from the differentiating circuit 612, 614, 616.

The charging current which is applied to capacitor 637 also appears at the base of transistor 634 which is connected as an emitter follower. Transistor 634 includes a collector connected to +12 volts, a base connected to capacitor 637 and the charge and discharge circuits therefor, and an emitter connected over resistor 638 to −12 volts. The emitter of transistor 634 is further connected over capacitor 636 to the base input of a transistor 642 which is connected as an emitter follower. The emitter output of transistor 642 is connected to the base of transistor 646 which is also connected as an emitter follower, the emiitter output of whch is connected over path 210 to the mixer circuit 217.

As will be shown, transistor 634 is connected to provide a high impedance output from capacitor 637. Capacitor 636 is connected in circuit for the purpose of changing the sawtooth waveform from a positive waveform relative to zero (see waveform adjacent to input for transistor 634) to a waveform which is zero at its midpoint (see the waveform adjacent the input to transistor 642). The two transistors 642, 646 which are connected as emitter followers provide temperature compensation and load coupling impedance matching.

In operation, the bias on the base of transistor 620 will cause the transistor 620 to be normally turned on and the capacitor 637 will be in the charged condition as a result of the current flow from +12 volts over resistor 622, transistor 620 and capacitor 637 to ground. As the triggering pulse is received from the path vertical delay circuit 204 (i.e., once in each vertical raster, it being recalled that the timing of the triggering pulse is variable during the vertical trace of the raster in accordance with the input signals provided over inputs 569 to the path vertical delay circuit 204), switch 618 is turned on to complete a discharge circuit for capacitor 637, which extends from the upper turn of capacitor 637 over transistor 618 to ground. During discharge, the portion of the curve indicated at "A" adjacent the input to transistor 634 occurs. As the triggering pulse is terminated, transistor 618 turns off, and capacitor 637 is charged over the above described charging circuit at a rate which is determined by the value of resistor 622 and the conducting properties of the transistor 620. Resistor 630 is adjusted to different positions to vary the conducting characteristics of transistor 620 and thereby the size of the waveform output over transistor 634. The charging current continues until the next triggering pulse is received from the path delay circuit 204 (point A′ on the illustrated wavefrom).

As indicated above, the output waveform is transmitted over emitter follower 634, and coupling capacitor 636 to adjust the zero reference point to the midpoint of the sawtooth output. The sawtooth is then conducted over transistor 646 and output path to mixer 217. As will be shown in the following description, the point of initial occurrence of the sawtooth during the raster trace will determine the point at which the apex of the path is generated on the display, and such point is adjusted upwardly and downwardly by variation of the input signals to the path vertical delay circuit 204.

*Path Triangle Generator Circuit*

Referring now to FIGURE 4, the path triangle generator circuit 212 includes a first input circuit connected to conductor 135 which extends to the horizontal sawtooth generator 134 (FIG. 3), to provide a sawtooth waveform as each horizontal line is traced on the raster. A second input circuit 214 to path triangle generator circuit 212 provides sawtooth signals from the path heading sawtooth circuit 202 which is in turn controlled by signals received over input paths 20 and 205. The signals over input circuit 20 comprise signals which change in polarity and amplitude with changes in heading of the aircraft, and are obtainable from the aircraft directional gyro 22. If the device is used with a similator, the signals can be provided by a simple potentiometer which is movable to different positions to provide D.C. signals of variable amplitude and polarity. The second input path 205 is connected over capacitor 207 (FIG. 18) to the output circuit 206 of the path vertical delay circuit 204. It will be recalled that the output signal provided over circuit 206 comprises a pulse having a leading edge which is shifted in time during a raster trace with changes in the input signals to input circuit 569 for path vehicle circuit 204, and as a result thereof, will effect vertical adjustment of the path apex to different positions on the display.

The output signal of path heading circuit 202 will thus comprise a sawtooth waveform which varies in amplitude and polarity with changes in the signal on path 20, and which varies in its time of generation during a raster with a change in the input signal on path 20.

Referring now to FIGURE 19, the path triangle generator circuit 212 which is controlled by the signals on conductor 214 basically comprises a differential amplifier 655 which includes a first transistor 658 and a second transistor 664 which are connected in the manner of the differential amplifier 562 described above, and accordingly a detailed description thereof is not repeated.

As will be apparent, the horizontal sawtooth input signals received over conductor 135 are applied to the base of the transistor 658, and the signals received over conductor 214 from the path heading sawtooth circuit 202 are applied to the base of the second transistor 664. The sawtooth output of the circuit 202 is linear, and in the present embodiment capacitance 673 (FIG. 18) is inserted in the path to provide a nonlinear slope for the trailing edge of sawtooth, thereby generating a curved path. The output of the first transistor 658 is connected to a first transistor 682 connected as an emitter follower, and the output of a second transistor 664 is connected to the base of a second transistor 684 connected as an emitter-follower. The collectors of the two-emitter-followers are connected to +12 volts, and the emitters are connected common over resistor 686 to ground. The emitter-followers 682, 684 in operation operate in the manner of the pair of diodes 330, 328 (FIG. 14) to mix the output of the differential amplifier transistor 658, 664 to provide a triangular waveshape. The emitter followers 682, 684 are preferred to diodes at this point of the circuitry in that an extremely sharp apex is desired on the triangle wave shape output for use in generation of the flight path.

The output of transistors 682, 684 is extended over transistor 688 which is connected as an amplifier and inverter. The triangular shaped waveform output from transistor 688 is transmitted over output path 216 to the input of mixer 217.

The operation of the path triangle generator circuit is now set forth. As a horizontal sawtooth waveform is applied to the base of transistor 658 at the start of each line trace, a rising waveform occurs in the collector output of transistor 658, as illustrated by waveform K-L. Simultaneously, a decreasing waveform M-N occurs in the collector output of transistor 664.

In the event that signals are received at the base of the second transistor 664 from path heading sawtooth circuit 202 indicating that the path apex should be laterally displaced from the center (which signal is either a plus or minus sawtooth) the path is curved from its center position in a related manner.

With normal off course heading information input over path 20 and normal path vertical position input signals on input 569 (FIG. 18), the sawtooth output of circuit 202 over path 214 to transistor 664 (FIG. 19) will not occur until the start of apex of the path, at which time the signal from the path triangle circuit 212 will be generated earlier or later depending on the polarity of the sawtooth 202. Thereafter, as each line is drawn the decreasing value of the sawtooth input to transistor 658 results in the generation of a triangle, the base of which occurs with normal signal input at the midpoint of each normal line trace.

Briefly, as the first portion of the horizontal sawtooth is received over conductor 135 the left hand transistor can be assumed to be on (for purposes of explanation) and the right hand translator off. There is no change in the output waveform at the collector of the left hand transistor 658 until such time as the input sawtooth waveform approaches the value of the bias which has been placed on the base of the right hand transistor 664. As the sawtooth waveform on conductor 135 approaches such value, the left hand transistor 658 acts in the manner of an amplifier, and the output waveform on the collector of transistor 658 changes with the input until such time as the end of the sawtooth occurs, or alternatively, until such time as the left hand transistor 658 is biased to cutoff.

During such period, the waveshape at the collector of the right hand transistor 664 changes in the direction opposite to that of the waveform on the left hand transistor 658. The value of the resistor 662, 668 in the common emitter circuit of the two transistors determines the rate of change or slope of the waveform at the collectors (the smaller the resistance, the faster the rise time). Since the sawtooth output of path heading sawtooth circuit 202 is nonlinear, the path will have the curved configuration of FIGURE 2 whenever the apex is displaced from the center.

In one successful embodiment the following components were used for the path triangle generator circuit 212.

| | |
|---|---|
| Transistors 658, 664, 670, 682 684 | 2N2925. |
| Resistors 660, 666 | 2.7K. |
| Resistors 662, 668 | 910. |
| Resistor 672 | 1.21K. |
| Signal input over path 135 | 6 v. P.P. |
| Signal input over path 214 | 2 v. P.P. |
| Resistor 674 | 22K. |
| 676 | 4.7K. |
| 678 | 1.5K. |
| 680 | 10K. |

In brief summary, there will be no output provided by the two transistors 658, 664 until such time as the value of the horizontal sawtooth received over path 135 reaches the value of the signal on the base of transistor 664, and at such time as indicated by the letters B on the set of waveforms shown adjacent the outputs, the conduction of the differential amplifiers will result in the slopes of the indicated waveforms to provide a triangle which has its apex at the center of the horizontal trace of the line. By changing the bias signal on the input conductor 214 to a minus value, the differential amplifier 655 will provide waveform slopes to the emitter followers 682, 684 which result in the generation of the triangle having an apex at a correspondingly later point in the horizontal line traces. With a positive bias the triangle apex occurs a correspondingly earlier point in the horizontal line trace. As noted earlier transistor 688 amplifies and inverts the resultant triangular wave shape.

*Mixer Circuit*

The output of the transistor 688 of path triangle generator circuit 212 is coupled over path 216 to one input of mixer 217, and the output of the path sawtooth circuit 208 is coupled over path 210 to the second input circuit of mixer 217. As shown, the mixer circuit 217 basically comprises a resistor network including input resistor 694 connected to path 216, a mixer resistor 700 connected to path 210, and a vertical positioning bias circuit including resistors 696, 698 connected to the junction of resistors 694 and 700.

The output of the mixer circuit 217 is connected to the base of emitter-follower transistor 704 which includes a collector element connected to ground, and an emitter element connected over resistor 702 to +12 volts. The emitter is also connected over paths 220 and 224 to the inputs for the first clipper circuit 222 and the second clipper circuit 226 respectively.

At this time, the waveform input to the paths 220, 224 comprise (a) positive going sawtooths from path sawtooth circuit 208 which occur at the rate of the vertical trace, the sawtooth starting at a vertical time position in the trace which is determined by the input signals to input circuit 569 (FIGURE 18) which control the vertical position of the flight path, and (b) positive triangular pulses superimposed on the sawtooth waveform which occur once in each horizontal line trace at positions determined by the bias signals which have been coupled to the path triangle generator circuit 212 by path heading sawtooth circuit 202 which determines the lateral position of the path. Resistor 696 permits adjustment of the vertical position of the path.

Clipper Circuit

First clipper circuit 222 basically comprises an input circuit including resistor 712 connected to the base of a clipper transistor 718 which base is also connected over resistor 714 and 716 to −12 volt potential. The collector of transistor 718 is connected over resistor 720 to +4 volts, and the emitter element is connected over resistor 724 to −12 volts and over diode 722 to ground. The collector of the transistor 718 is also connected to the base of clipper amplifier 728 which includes an emitter connected to ground and a collector connected over resistor 726 to +4 volts. The collector output of transistor 728 (and thereby the clipper circuit 222) is connected over conductor 230' to the collector of transistor 808 and diode 734 (FIG. 20) to the input path 230 for the mixer amplifier circuit 70.

In operation, as the triangular shaped waveform generated in each succession of the trace as combined with the positive sawtooth wave coupled to the base of the transistor 718, together, exceed the bias of the base-emitter circuit of transistor 718 (line A—FIG. 9), the transistor 718 conducts and the portion of the waveform shown at F, G (FIG. 19) appears at the collector of transistor 718. As the transistor reaches saturation, the portion of the curve F, G, occurs, and as the value of the combined sawtooth and triangular waveshape for the horizontal line falls below the established bias value, transistor 718 turns off and the portion G, H of the waveform occurs. Transistor 718 remains turned off for the remainder of the horizontal line trace.

The output pulse from transistor 718 is amplified by transistor 728 and a pulse with more nearly vertical leading and trailing edges occurs at the collector thereof which is transmitted over conductor 230', diode 734 and path 230 to the mixer-amplifier circuit 70 (FIG. 3). The pulse is further amplified and extended over amplifier 37 to the cathode ray tube 34. During the period in the horizontal line trace that the pulse occurs, a white trace will occur on the raster, the duration of the white trace being determined by the duration of the pulse output from mixer amplifier 70 during the horizontal line trace. It is apparent that as pulses are generated in this manner during successive line traces, the increasing value of the vertical sawtooth during successive traces results in pulses of successively increased width for successive lines, and absent other signals, a white path having a wedge shaped outline on the raster is provided as shown in FIGURE 9. Since the initial pulse in the present example occurred concurrently with the horizon line trace, the first path pulse is transmitted to the cathode ray tube 34 therewith to cause the apex to appear at the horizon line. Since the triangular pulses were assumed to occur with the apex at the center of each horizontal trace, the apex of the flight path will occur at the horizontal center of the display.

According to a novel feature of the invention, the present path is comprised of only two marginal edges, the center of the path being blanked out so that the ground texture and ground background which occur beneath the center portion of the path will be visible. In achieving such manner of display, a clipper circuit 226 which is identical to clipper circuit 222, is connected over path 224 and an input circuit including resistors 713 and 715 to the output of the mixer circuit 217. Resistors 713 and 715 are selected so that the clipper circuit 226 is biased more negative, and requires a more positive signal to conduct than clipper circuit 222.

The clipper circuit 226 operates in the manner of the clipper circuit 222 and by reason of the increased bias (as illustrated in FIG. 10) provides output pulses which, if coupled directly to the cathode ray tube generator 34 would create a path such as shown by the shaded path in FIGURE 10 which would be narrower in its width at all points through the illustrated path. However, the signals thus provided are transmitted over path 228 and resistor 740 to the input of gate circuit 223 which basically comprises switching transistor 730 normally biased to cutoff by negative potential applied over resistor 742 to the base thereof.

During the period that pulses are received over the conductor 228 from the second clipper circuit 226, the transistor 730 is turned on, and the signals which are provided by the first clipper circuit 222 for path 732 are shunted to ground. During such period, therefore, only the first and last portion of the first path will be traced on the raster, and as a result paths, such as shown in FIGURES 1 and 2, are provided wherein the path is comprised of only two narrow lines in the form of an inverted V which extends from the horizon line to the bottom marginal edge of the display. As the output of the signal clipper circuit 226 turns gate 223 off in each line trace, the output of the first clipper circuit 222 appears on the display to trace such portion of the second inverted line of the path. Thereafter, in each line trace, the signal output of the first clipper circuit is terminated for the remainder of the line trace.

Resistor 716 is adjustable to different positions to thereby vary the input bias on the first clipper circuit, and the width of the lines which form the marginal outline of the path.

It will be recalled that the time of occurrence of the leading edge of the sawtooth output from path sawtooth circuit 208 determines the initial point of occurrence of the path apex on the display. (See FIG. 10 for example.) In that the sawtooth has a duration of a vertical trace, it is apparent that whenever the sawtooth starts after a raster trace has been initiated, it will continue until a corresponding time in the succeeding raster, and failing blanking operation, such portion of the path would appear in the sky portion of the succeeding trace.

As shown in FIGURE 4, a signal is therefore derived from the path vertical delay circuit 204, the leading edge of which occurs concurrent with the start of each raster trace and the trailing edge of which occurs at the start of the vertical sawtooth which results in the generation of the flight path. Such signal is applied to mixer and blanking circuit 245 to block the path from appearing on the display prior to the generation of the path apex.

As shown in FIGURE 18, such signal is derived from the collector of differential amplifier 590 and coupled over path 591 (FIGS. 19, 20) to mixer and blanking circuit 245 (FIG. 20). Circuit 245 includes a transistor 808 having an emitter element connected to ground, a base element connected over resistor 806 to ground and over resistor 804 to input conductor 591, and a collector connected to the output conductor 230′ and over diode 734 to output conductor 230 which provides the path output signal to the display device.

At the start of each raster trace the leading edge of the pulse output of transistor 590 turns on transistor 808 which conducts the output signals on path 230′ to ground to block the path cue on the display. As the trailing edge of the pulse output of transistor 590 occurs, (which is substantially concurrent with the generation of the leading edge of the path sawtooth,) transistor 808 is turned off, and the output signal on conductor 230′ is fed out over diode 734 and conductor 230 and amplifier 37 to the display unit 34.

Summarily, changing D.C. input signals by the path vertical positioning circuit 200 vary the time of generation of the vertical sawtooth signal in a raster by path sawtooth circuit 208, and thereby the vertical position of the path. Changing D.C. input signals over path 20 (amplitude and polarity) change the time of generation of the triangles in each line trace and thereby the lateral position of the path apex on the display.

*Intercept Circuitry*

As noted above, the novel circuitry is also operative to provide a narrow white line identified as an intercept line which extends laterally across the screen to indicate the position of the aircraft relative to a second preselected omni station while on a course to a first selected omni station. As shown in FIGURES 11 and 12A–12C, as the aircraft moves closer to the intercept line for the station 2 in its progression along its course toward station 1, the line moves downwardly from the horizon (FIG. 12A) to successively lower position on the display (FIG. 12B) and as the aircraft crosses the intercept line (FIG. 12C) the line moves to the lower edge of the screen.

The circuitry for providing such information is set forth in FIGURE 20, and as there shown basically comprises an input circuit 77 over which input signals representative of the position of the second omni station 2, are provided. A positive-going sawtooth waveform provided over path 76 is connected to the second input of the triangle generator 236 (which may be similar to triangle generator 212 described above) whereby a triangular shaped waveform is provided once during each vertical trace of the raster. In that a ground texture sawtooth is being used as an input over conductor 76 to the triangle generator 236, it will be apparent that the triangular shaped wave form will occur only during the period of tracing of the ground texture. Positioning of the triangular pulse timewise relative to the vertical raster trace will be additionally determined by the value of the VOR signal input over path 77 to the triangle generator circuit 236.

The output of the triangle generator circuit 236 is connected to gate 240, which gate transmits the pulses over conductors 244, 230 to the mixer-amplifier circuit 70 for transmission to the gun of the cathode ray tube 34. A signal which is derived from the output of the second clipper circuit over path 242 controls gate 240 to prevent tracing of the intercept line on the raster during the period the center portion of the flight path is being traced.

More specifically, as shown in FIGURE 20, the input conductor 77 is connected over resistance 750 to the input circuit which extends to the base of the right hand transistor (not shown) in triangle generator 236, capacitors 753, 754 being connected between the input circuit and ground. Resistors 756, 758 and 760 are connected between +12 volts and −12 volts. The junction of resistors 758, 760 is connected over resistors 759 to the first input circuit. The base of the constant current transistor is connected over path 755 to bias circuit 602. (FIG. 18).

The second input circuit 76 over which the positive going waveform is obtained from the vertical sawtooth generator 74 for the ground texture circuit is coupled to the circuit of the left hand transistor (not shown) in the triangle generator 236. The triangle wave shaped output of the generator 236 is connected over path 238 and resistor 764 to the input of transistor 768, the base of which is also connected over resistor 766 to −12 volts. The emitter element of transistor 768 is connected to ground, and the collector is connected over resistor 770 to +12 volts, and also over resistor 772 to the input of gate 240.

Gate 240 comprises a first transistor 792 including a collector connected over resistor 794 to +4 volt potential, and a base connected over resistor 780 to +4 volt potential, and also to the output of transistor 768, and an emitter connected over resistor 798 to −12 volts and over diode 796 to ground. The output of amplifier 792 is connected to a second transistor 800, the output of which is in turn connected over resistor 798 and diode 792 to the output paths 244, 230, and mixer—amplifier circuit 70 for transmission to the gun of the cathode ray tube 34. With the receipt of a signal over conductor 76 from the omni receiver, triangle generator 236 provides an output triangle pulse conversion thereof over path 238 to amplifier 768. The resultant pulse is shaped by transistors 792, 800 to provide more nearly vertical leading and trailing edges and as coupled over diode 792 and paths 244, 230 provides a horizontal white line across the raster display as shown in FIGURES 12A–12C.

As noted above, the portion of such white line which crosses the flight path is blanked out. Such blanking is accomplished by the signal output from the second clipper circuit 266 (FIG. 19), which is extended over path 242 and RC network 788, 790 to the input of transistor 778.

Transistor 778 includes an emitter element connected over diode 782 to ground, and over 784 to −12 volts, a base element connected over resistor 786 to −12 volts (and to input conductor 242 from the clipper circuit 226) and a collector element connected to the base of switching transistor 802.

With the occurrence of a pulse on conductor 242 in each horizontal line trace during which the flight path is being traced, transistor 778 provides an output pulse to transistor 802 which conducts to connect the output of transistor 800 directly to ground. As a result, such portion of the signal which would normally be transmitted over diode 792 and paths 244, 230 to the mixer-amplifier circuit 70 is shunted to ground, and the portion of the line which crosses the flight path will not be displayed.

While what is described is regarded to be a preferred embodiment of the invention, it will be apparent that variations, rearrangements, modifications and changes may be made therein without departing from the scope of the present invention as defined by the appended claims.

What is claimed is:

1. In a visual cue generator circuit for generating signals for reproduction as visual cues on the raster of a display device, a first plurality of triangle generator circuits controlled to operate in succession at the horizontal line rate of said raster, a second plurality of triangle generator circuits controlled to operate successively at the vertical trace rate of said raster, means for providing a readout pulse at the vertical rate of said raster, and means responsive to said readout pulse and the signal output of said first and second plurality of triangle generators to provide a plurality of spaced quadrilateral symbols on said raster which have their vertical sides slanted toward the top of the display to provide a symbol in perspective.

2. In a visual cue generator circuit for generating signals for reproduction as visual cues on the raster of a display device, a first plurality of triangle generator circuits controlled to operate in succession at the horizontal line rate of said raster, a second plurality of triangle generator circuits controlled to operate successively at the vertical trace rate of said raster, means for providing a sawtooth readout pulse at the vertical rate of said raster, and means responsive to said sawtooth readout pulse and a concurrent pulse from said first and second plurality of triangle generators to provide a video signal to said display device.

3. In a visual cue generator circuit for generating signals for reproduction as visual cues on the raster of a display device having speed sensor means, a first plurality of pulse generator circuits controlled to operate in succession during at least each line trace of a selected plurality of horizontal line traces of said raster, a second plurality of pulse generator circuits, at least one of which is controlled to operate during at least a portion of the vertical trace of said raster, means for providing symbol producing signals to said display device responsive only to concurrent receipt of a signal from at least one pulse generator of said first plurality, and a signal from at least one pulse generator of said second plurality, and speed control means coupled to said sensor means for adjusting the operation of said one pulse generator to different times in successive raster traces at uneven rates to thereby provide vertical perspective motion of the symbol on the display.

4. A visual cue generator circuit as set forth in claim 3 in which said one pulse generator includes a first and a second input, and said speed control means includes a resistance element and at least one wiper on said resistance element, means for effecting relative movement of said wiper and said resistance element at a rate related to the speed of the mobile unit, means for connecting the signal derived by said wiper in its different relative positions with said resistor element to said first input circuit of said one pulse generator circuit, and means for applying a non-linear sawtooth to said second input circuit at the vertical rate of the raster.

5. In a visual cue generator circuit for generating signals for reproduction as visual cues on the raster of a display device for a mobile unit having speed sensor means, a first plurality of pulse generator circuits controlled to operate in succession during at least each line trace of a selected plurality of horizontal line traces of said raster, a second plurality of pulse generator circuits, at least one of which provides an output signal for the period of at least a plurality of horizontal line traces of said raster, a first input circuit for said one pulse generator circuit, speed control means connected to said first input circuit to adjust said period to a different number of said horizontal lines, a second input circuit for said one pulse generator circuit, sawtooth generator means for coupling a sawtooth waveform to said second input circuit at the vertical rate of said raster, means in said one pulse generator operative to provide a pulse output only when said two input signals are at a predetermined relative value, readout means for providing a readout pulse, and means for providing symbol producing signals to said display device responsive only to concurrent receipt of said readout pulse, a signal from at least one pulse generator of said first plurality, and said output signal from said one pulse generator of said second plurality.

6. A visual cue generator circuit as set forth in claim 5 in which each of said pulse generators of said second plurality include a first and a second input circuit, and said speed control means extend a different value signal to the first input circuit on each of said pulse generators of said second plurality, and in which said sawtooth waveform is coupled to the second input circuit of each of said second plurality of pulse generators.

7. In a visual cue generator circuit for generating signals for reproduction as visual cues on the raster of a display device having speed sensor means, a first plurality of pulse generator circuits controlled to operate in succession during at least each line trace of a selected plurality of horizontal line traces of said raster, a second plurality of triangle generator circuits, at least one of which comprises a differential amplifier circuit having a first and a second input circuit, means for connecting a control signal to one of said input circuits of a value to enable said one triangle generator for a predetermined number of horizontal line traces, means for changing the value of said control signal during successive raster traces, means for providing a sawtooth signal at the vertical rate to said second input circuit, and output means for extending an output signal only responsive to the signals received over said two input circuits reaching a predetermined relative value.

8. In a visual cue generator circuit for generating signals for reproduction as visual cues on the raster of a display device for a mobile unit having speed sensor means, a first plurality of pulse generator circuits controlled to operate in succession during at least each line trace of a selected plurality of horizontal line traces of said raster, a second plurality of pulse generator circuits, at least one of which comprises a differential amplifier circuit having a first and a second input circuit, means for connecting a control signal to one of said input circuits, means for changing the value of said control signal during successive raster traces, means for providing a sawtooth signal at the vertical rate to said second input circuit, output means for extending an output signal only responsive to the signals received over said two input circuits reaching predetermined relative values, and means for providing symbol producing signals to said display device responsive only to concurrent receipt of a signal from at least one pulse generator of said first plurality, and said output signal from said one pulse generator of said second plurality.

9. In a visual cue generator circuit for generating signals for reproduction as visual cues on a display device, control means for providing a raster trace on said display device, a first plurality of triangle generator circuits, means including a vertical sawtooth generator operated at the vertical rate of said raster, and a horizontal sawtooth generator operated at the horizontal rate of said raster for controlling said first plurality of triangle generator circuits to operate successively at the horizontal line rate of said raster, a second plurality of triangle generator circuits, means including said vertical sawtooth generator for controlling said second plurality of triangle generators to operate successively at the vertical rate of said raster, switch means operable at a predetermined signal level to provide a signal output, means for applying the output of said vertical sawtooth generator and said first plurality of triangle generators to said switch means, said switch means being conductive as the combined level of the applied signals exceed said predetermined signal level, and means for providing a symbol producing signal to said display device responsive only to concurrent receipt of a signal from said switch means and a signal from one triangle generator of said second plurality.

10. In a visual cue generator circuit for generating signals for reproduction as visual cues on the raster of a display device, a first plurality of triangle generator circuits for providing pulses in succession at the horizontal line rate of said raster, a second plurality of tringle gentrator circuits for providing pulses successively at the vertical trace rate of said raster, means for providing a sawtooth pulse at the vertical rate of said raster, signal producing means for providing an output signal responsive to signals of a predetermined input value, means for coupling said sawtooth pulse and the pulse output of said first plurality of triangle generators to said signal producing means, and means controlled by the pulse output of said second plurality of triangle generators to gate the output of said signal producing means to said display device only during concurrent pulse outputs by the triangle generator of said first and second plurality.

11. In a visual cue generator circuit for generating signals for reproduction as visual cues on the raster of a display device, a first plurality of pulse generator circuits operative successively during each line of a plurality of horizontal line traces of said raster, a second plurality of pulse generator circuits including at least one pulse generator circuit operative for the duration of a number of horizontal line traces in a raster, means for providing a readout pulse, a first and a second signal producing means, means for coupling said readout pulse and the output of certain ones of said first plurality of pulse generators to said first signal producing means, means for coupling said readout pulse and the output of other ones of said first plurality of pulse generator means to said second signal producing means, and means for selectively gating a signal of one of said signal producing means to said display device only when an output pulse from one of said first plurality of pulse generator circuits and an output pulse from one of said second pulse generator circuits are concurrent in time.

12. In a visual cue generator circuit for generating signals for reproduction as visual cues on the raster of a display device, a first plurality of pulse generator circuits controlled to operate in succession during each of a plurality of horizontal line traces of said raster, a second plurality of pulse generator circuits, at least one of which is controlled to operate during a number of horizontal line traces of said raster, means for providing a readout pulse, a first and a second clipper circuit, means for connecting the output of certain ones of said first plurality of pulse generator circuits to said first clipper circuit, means for connecting the output of others of said first plurality of pulse generator circuits to said second clipper circuit, means for coupling said readout pulse to both clipper circuits, a first gate circuit for gating the output of said first clipper circuit to said display device, a second gate circuit for gating the output of said second clipper circuit to said display device, means for connecting the signal output of certain of said pulse generators of said second plurality to said first gating circuit, and means for coupling the signal output of others of said pulse generators of said second plurality to said second gating circuit, and means for connecting the gated output of said clipper circuits to said display device.

13. In a visual cue generator circuit for generating signals relating to the movement of a mobile unit for reproduction as visual cues of the movement on a raster of a display device, a first plurality of pulse generator circuits, signal means for operating at least one of said pulse generator circuits during each of a plurality of horizontal line traces of said raster, at least one of which is operated during a portion of the vertical trace of the raster, means for providing a readout pulse at the vertical rate of said raster, means for providing symbol producing signals to said display device responsive only to concurrent receipt of a part of said readout signal, a signal from at least one pulse generator of said first plurality, and a signal from at least one pulse generator of said second plurality; and rate-of-turn means for effecting lateral shifting of the resultant symbol on the display at a rate proportional to the rate-of-turn of said mobile unit.

14. A system as set forth in claim 13 in which said signal means includes adjustable means operable to provide signals of different polarities and amplitudes to said one pulse generator circuit of said first plurality, sensor means for providing motion representative signals indicating a turning movement of said mobile unit, means controlled by said motion representative signals for generating rate-of-turn signals indicating the rate of change in said turning movement, and means controlled by said rate-of-turn signals to operate said adjustable means at a corresponding rate.

15. In a visual cue generator circuit for generating signals for reproduction as visual cues on the raster of a display device, horizon line means for generating a horizon line on the display, a first plurality of pulse generator circuits operative in succession at the horizontal line rate of said raster, a second plurality of pulse generator circuits operative successively at the vertical trace rate of said raster, means for providing a readout pulse at the vertical rate of said raster, means responsive to said readout pulse and the signal output by said first and second plurality of pulse generators to provide a plurality of spaced quadrilateral ground symbols on said raster between said horizon line and the bottom marginal edge of said display, and means including a path generator circuit for producing a path having an inverted V outline on said display with said ground symbols and said horizon line.

16. In a visual cue generator circuit for generating signals for producing a path cue on the raster of a display device, a pulse generator circuit controlled to operate at the horizontal line rate of said raster, a sawtooth generator circuit controlled to operate at the vertical trace rate of said raster, a first signal producing means responsive to a predetermined value signal output by said sawtooth generator circuit and said pulse generator circuit to provide output signals which increase in time duration during successive line traces of the raster, and means for gating only a small portion of the leading and trailing ends of each of said output signals to said display device.

17. A visual cue generator circuit as set forth in claim 16 which includes a path heading sawtooth circuit for providing a nonlinear sawtooth waveform to said pulse generator circuit at the horizontal rate of the raster.

18. A visual cue generator circuit as set forth in claim 16 which includes intercept generator means for generating a horizontal intercept line on the display, gating means connected to said intercept generator means, and means connecting the signal output of said path outline means to enable said gating means in the blanking of said intercept line across said path cue.

19. In a visual cue generator circuit for generating signals for producing a path cue on the raster of a display device, a triangle generator circuit controlled to operate at the horizontal line rate of said raster, a sawtooth generator circuit controlled to operate at the vertical trace rate of said raster, a first signal producing means responsive to a predetermined value signal output by said sawtooth generator circuit and said triangle generator circuit to provide output signals which increase in time duration during successive line traces of the raster, and means for gating only a small portion of the leading and trailing ends of said output signals to said display device including a second signal producing means, means for connecting the output signals of said sawtooth generator circuit and said triangle generator circuit to said second signal producing means, bias means for said second signal means which effect operation thereof by the combined sawtooth and triangle signals at a later time in the vertical trace of the raster than said first signal means, and gate means controlled by the output of said second signal means to block the output of said first signal producing means from said display device.

20. In a visual cue generator circuit for generating signals for producing a path cue on the raster of a display device, a triangle generator circuit controlled to operate at the horizontal line rate of said raster, a sawtooth generator circuit controlled to operate at the vertical trace rate of said raster, a first signal producing means responsive to a predetermined value signal output by said sawtooth generator circuit and said triangle generator circuit to provide output signals which increase in time duration during successive line traces of the raster, a path vertical delay circuit connected to said sawtooth generator circuit to effect the occurrence of said output signals at different times in said vertical trace and thereby adjustment of the path to different vertical positions on the display, and a path heading circuit connected to said triangle generator circuit for effecting occurrence of said signals at different times in the horizontal line traces and thereby adjustment of said path heading to different horizontal positions on the display, and means for gating only a small portion of the leading and trailing ends of said output signals to said display device.

21. In a visual cue generator circuit for generating signals for producing a path cue on the raster of a display device, a triangle generator circuit controlled to operate at the horizontal line rate of said raster, a sawtooth generator circuit operative to provide a sawtooth waveform having the duration of a vertical trace rate of said raster, path vertical delay circuit for adjusting the leading edge of said sawtooth to initially occur at different times in a raster and to continue said sawtooth waveform until a corresponding time in the succeeding raster trace, signal producing means responsive to a predetermined value signal output by said sawtooth generator circuit and said triangle generator circuit to provide output signals which increase in time duration during successive line traces of the raster, means for blanking the portion of said output signals to said display device which occur prior to the point of occurrence of the leading edge of said sawtooth in the raster trace, and means for blanking substantial portions of each output signal by said signal producing means in each trace.

22. In a visual cue generator for generating signals to produce visual cues on a display device having radio detection equipment for providing signals indicating the intercept bearings to a second station while on a course to a first station, a generator circuit for generating a horizontal line at a first reference position on the display responsive to the first detected signal from said station, and means for controlling generation of said line at successively lower positions on the display as the signals indicate closer proximity to the intercept position.

23. In a visual cue generator for generating signals to produce visual cues on a display device having radio detection equipment for providing signals indicating the intercept bearings to a second station while on a course to a first station, a horizon line generator circuit for generating a horizon line on said horizon, a generator circuit for generating a horizontal line adjacent said horizon line responsive to the first detected signal from said station, and means for controlling generation of said line at successively lower positions on the display as the signals indicate closer proximity to the intercept position.

24. In a visual cue generator for generating signals to produce visual cues on a display device having radio detection equipment for providing signals indicating intercept bearings to a second station while on a course to a first station, a pulse generator circuit including a first and second input, means connecting the signals which indicate the relative position to the intercept line to said first input, a sawtooth generator circuit for providing sawtooth signals at the vertical rate of the raster, means for coupling the sawtooth waveforms to said second input of the pulse generator circuit, and means for coupling the signal output of the pulse generator circuit to said display device.

25. In a visual cue generator for generating signals for reproduction as visual cues on the raster of a display device, a first plurality of pulse generator circuits operative in succession during selected ones of said horizontal line traces on said raster to provide a plurality of output waveforms, each of which has an effective width for use in generating a symbol in each of said selected line traces, a second plurality of pulse generator circuits operative successively at the vertical trace rate of said raster to provide output waveforms, different ones of said second plurality of pulse generator circuits providing waveform outputs for correspondingly different groups of lines of the raster trace, readout means for generating a readout pulse at the vertical rate of said raster, and means responsive to the signal output of said readout means and said first and second plurality of pulse generators to provide signals to said display device which produce a plurality of spaced symbols on said raster.

26. A visual cue generator circuit as set forth in claim 25 which includes a predetermined control means for providing movement to said symbols on said raster comprising an adjustable potentiometer movable to different positions to provide output signals of changing values, and means for coupling said changing value signals to said pulse generator circuits of said second plurality to thereby change the vertical position of the symbols on said display.

27. A visual cue generator circuit as set forth in claim 25 which includes a first input means for providing signals of variable values to the pulse generator circuits of one of said plurality, and a second input means for providing a sawtooth signal, and in which each of said pulse generator circuits of said plurality comprises a differential amplifier having a first and second switch, one of said switches being controlled by the pulses received over said first input means, and the other of said switches being controlled by said sawtooth signal received over said second input means.

28. A visual cue generator circuit as set forth in claim 25 in which each of the pulse generator circuits of one of said plurality comprises a differential amplifier including a first and a second input, and which includes control means for said pulse generator circuits comprising an adjustable potentiometer for providing variable value signals to said first input circuits to correspondingly vary the position of corresponding symbols on the display device, and means for applying a sawtooth signal to said second input circuits to adjust the spacing between the symbols provided on the display device.

29. A visual cue generator circuit as set forth in claim 8 in which said symbols produced on said display device have a vertical position which is determined by the value of said control signal, and a vertical spacing on said display which is determined by the value of said sawtooth signal.

30. A visual cue generator as set forth in claim 13 which includes output means for providing signals from an attitude gyro indicating the rate of turn of said mobile unit, and in which said rate of turn means includes a differential amplifier circuit which provides drive pulses having variable duty cycles for different rates of turn, and means for varying the signal output of said first plurality of pulse generator circuits for different drive pulses.

References Cited by the Examiner

UNITED STATES PATENTS 3,093,822   6/1963   Balding _____ 343—11

CHESTER L. JUSTUS, *Primary Examiner.*

C. E. WANDS, *Assistant Examiner.*